(12) United States Patent
Yokoyama et al.

(10) Patent No.: US 8,660,058 B2
(45) Date of Patent: Feb. 25, 2014

(54) RELAY NODE, BASE STATION, AND USER EQUIPMENT FOR WIRELESS COMMUNICATIONS NETWORK

(75) Inventors: Hitoshi Yokoyama, Kawasaki (JP); Takayoshi Ode, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 156 days.

(21) Appl. No.: 13/238,521

(22) Filed: Sep. 21, 2011

(65) Prior Publication Data

US 2012/0008546 A1 Jan. 12, 2012

Related U.S. Application Data

(63) Continuation of application No. PCT/JP2009/056669, filed on Mar. 31, 2009.

(51) Int. Cl.
*H04B 7/14* (2006.01)

(52) U.S. Cl.
USPC ........... 370/315; 370/537; 370/338; 455/11.1

(58) Field of Classification Search
None
See application file for complete search history.

(56) References Cited

U.S. PATENT DOCUMENTS

| 8,259,637 B2* | 9/2012 | Bertrand et al. | 370/315 |
| 2006/0009210 A1* | 1/2006 | Rinne et al. | 455/423 |
| 2006/0264172 A1 | 11/2006 | Izumikawa et al. | |
| 2007/0098102 A1 | 5/2007 | Hottinen | |
| 2009/0092138 A1* | 4/2009 | Joo et al. | 370/392 |
| 2009/0280797 A1* | 11/2009 | So et al. | 455/422.1 |
| 2012/0188901 A1* | 7/2012 | Struhsaker et al. | 370/252 |

FOREIGN PATENT DOCUMENTS

| JP | 2000-31876 | 1/2000 |
| JP | 2006-295778 | 10/2006 |
| JP | 2007-49696 | 2/2007 |
| JP | 2008-301422 | 12/2008 |
| WO | 2007/052131 | 5/2007 |

OTHER PUBLICATIONS

International Search Report dated Jun. 16, 2009, from corresponding International Application No. PCT/JP2009/056669.

* cited by examiner

*Primary Examiner* — Duc C Ho
(74) *Attorney, Agent, or Firm* — Katten Muchin Rosenman LLP

(57) ABSTRACT

A relay node includes a processor that determines, based on uplink scheduler information, a target frequency band from plural frequency bands assigned to signals received from plural user equipments and multiplexes the signals received from the plural user equipments and a wireless communication interface that transmits the signals as a single carrier signal to a base station based on the target frequency band.

14 Claims, 41 Drawing Sheets

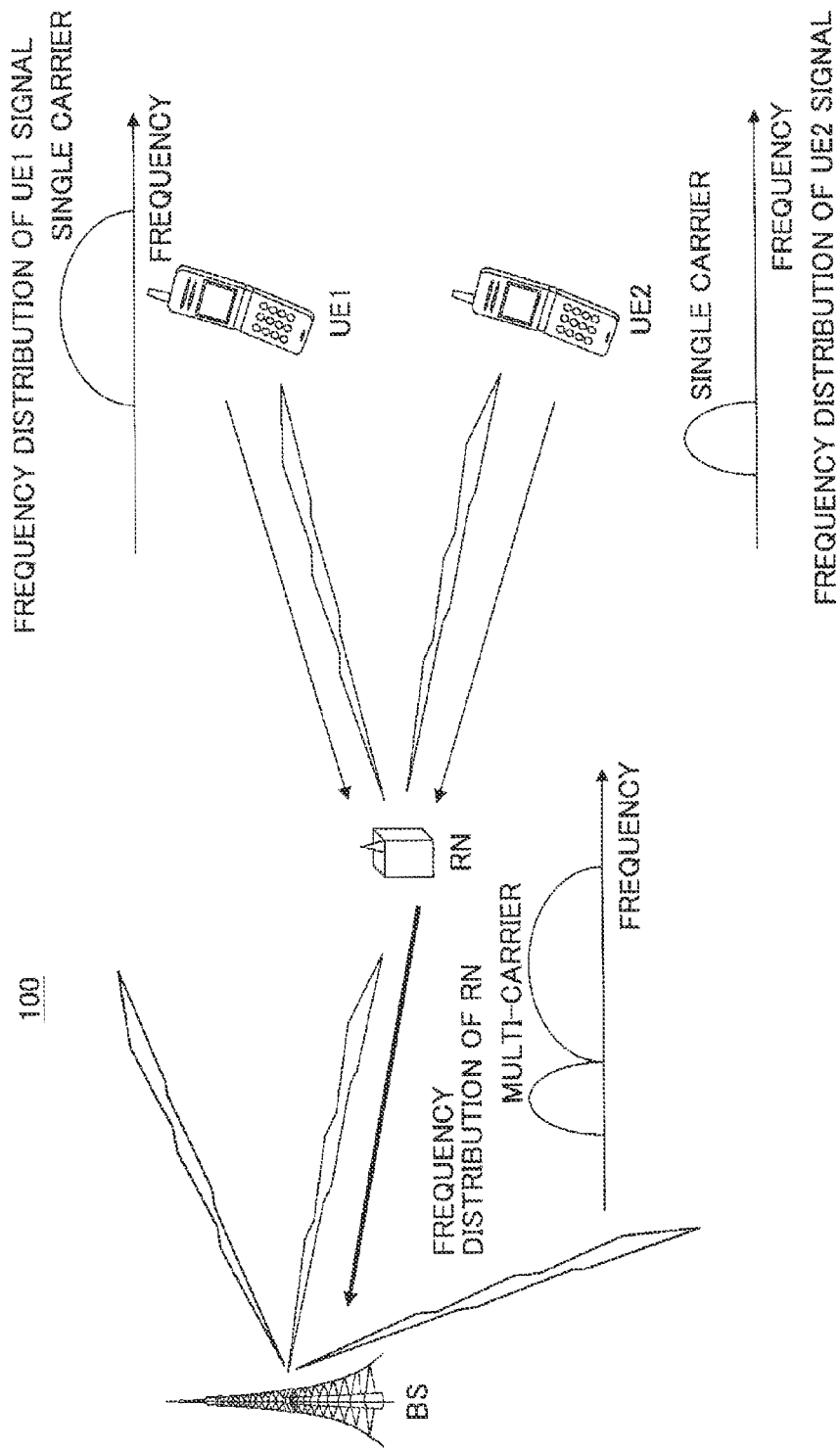

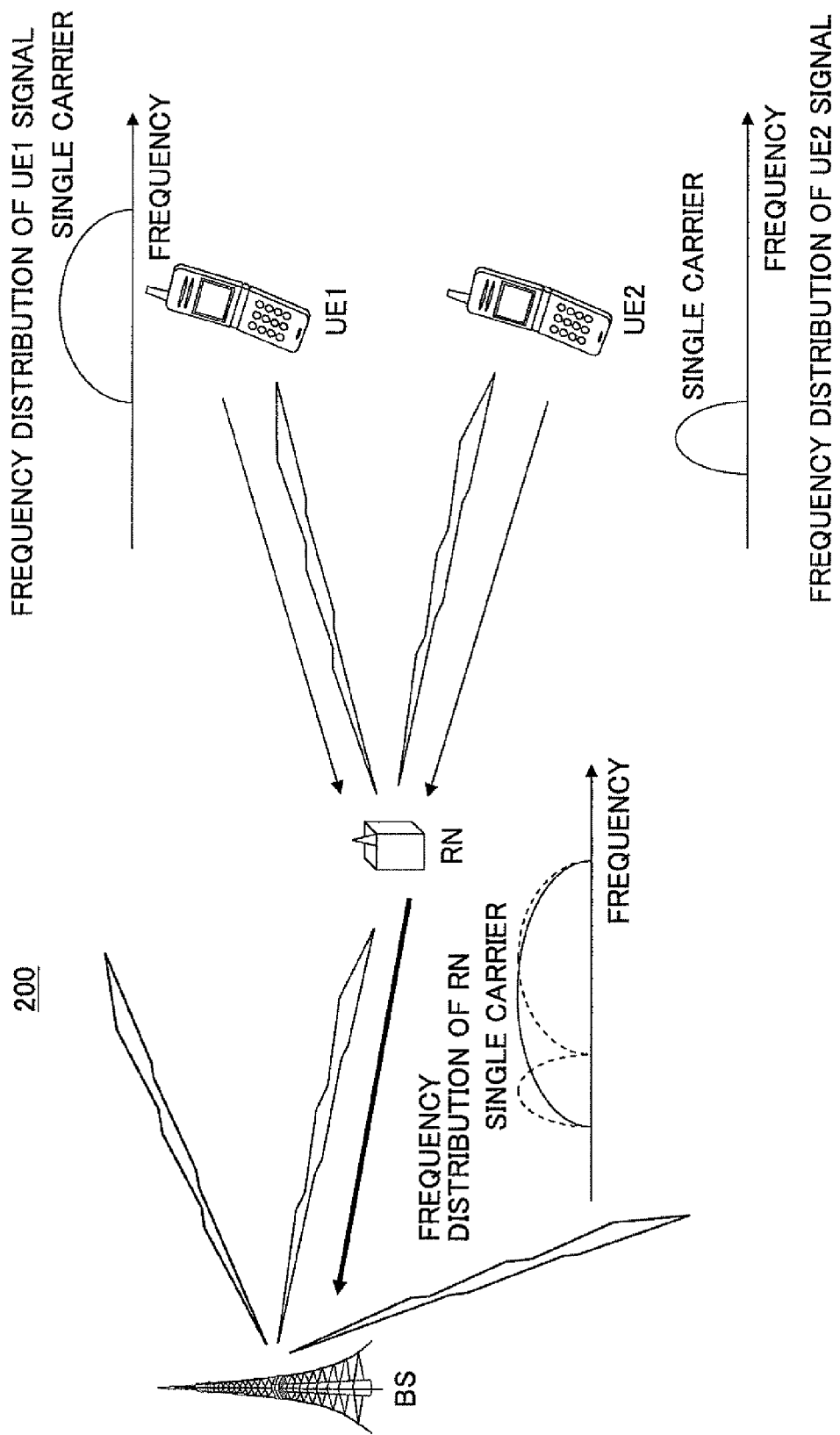

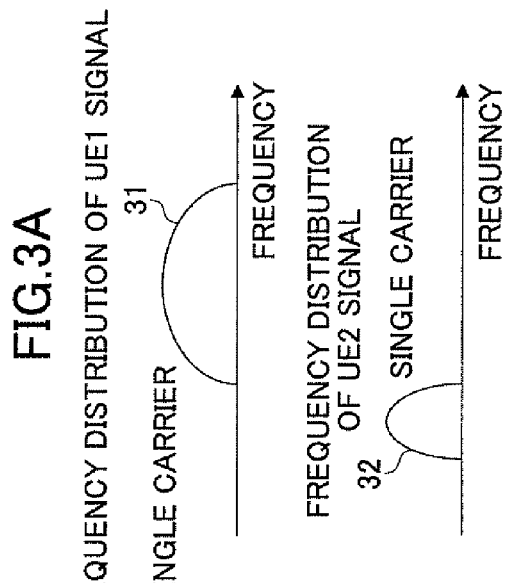
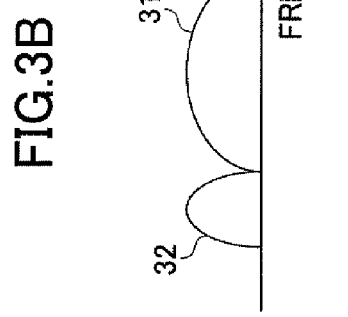
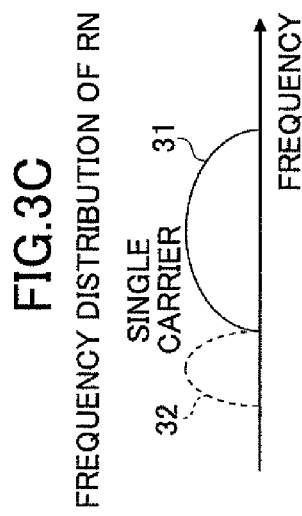

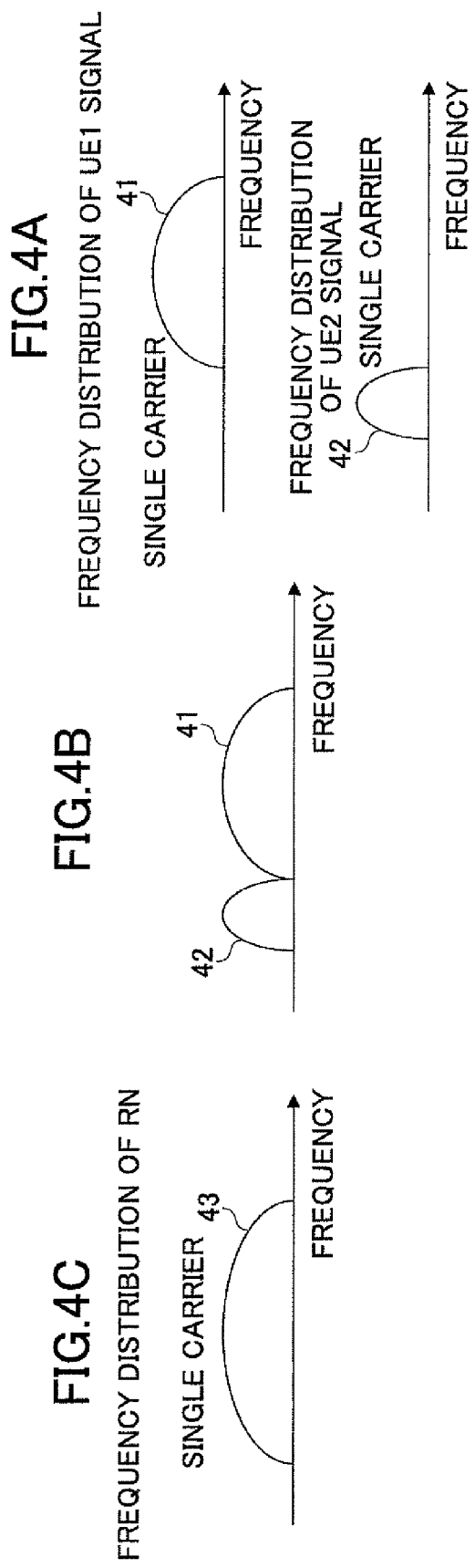

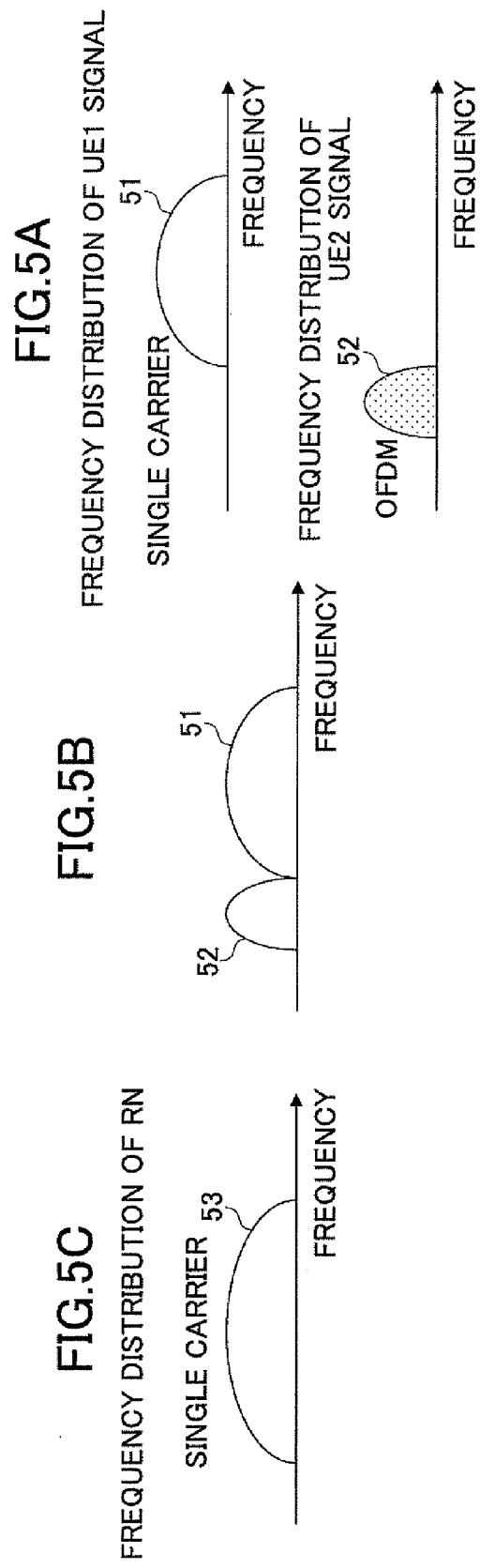

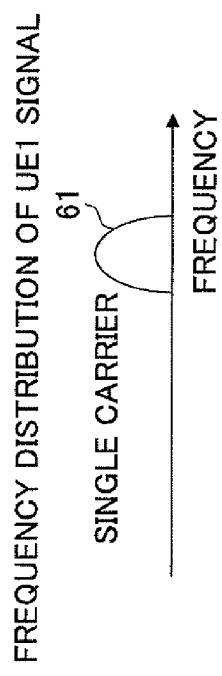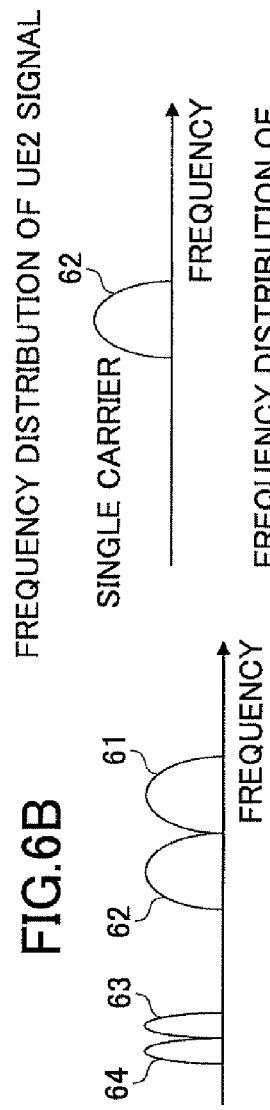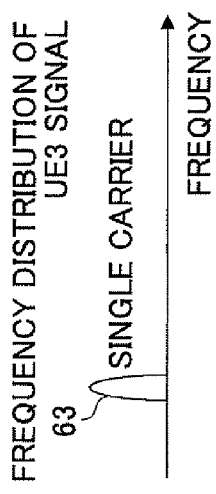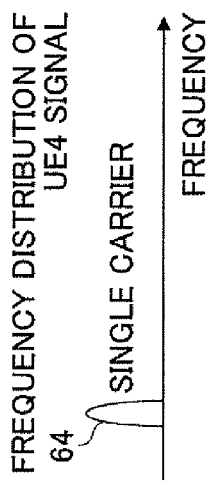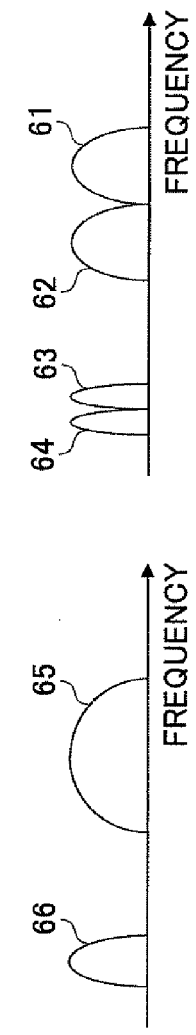

FIG.7A

FREQUENCY DISTRIBUTION OF UE1 SIGNAL
SINGLE CARRIER
71
FREQUENCY

FREQUENCY DISTRIBUTION OF UE2 SIGNAL
SINGLE CARRIER
72
FREQUENCY

FREQUENCY DISTRIBUTION OF UE3 SIGNAL
OFDM
73
FREQUENCY

FIG.7B 71
72
73
FREQUENCY

SIGNALING (RRC/MAC)

FIG.7C

FREQUENCY DISTRIBUTION OF RN
SINGLE CARRIER
74
FREQUENCY

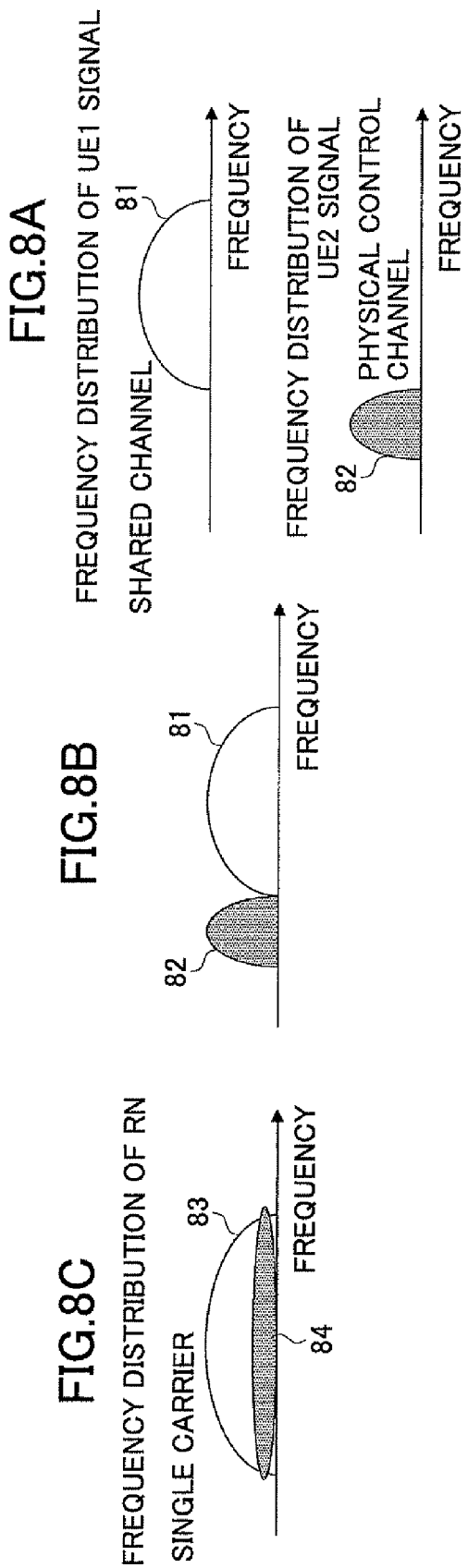

FIG.12A
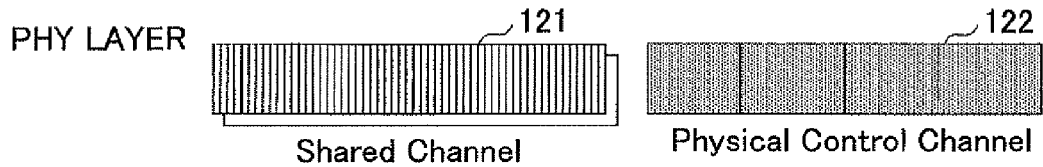
FIG.12B
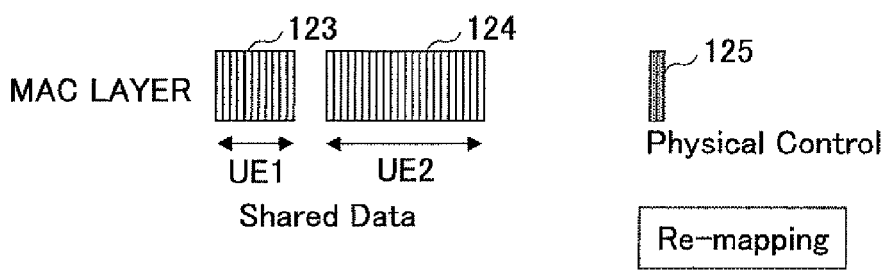
FIG.12C
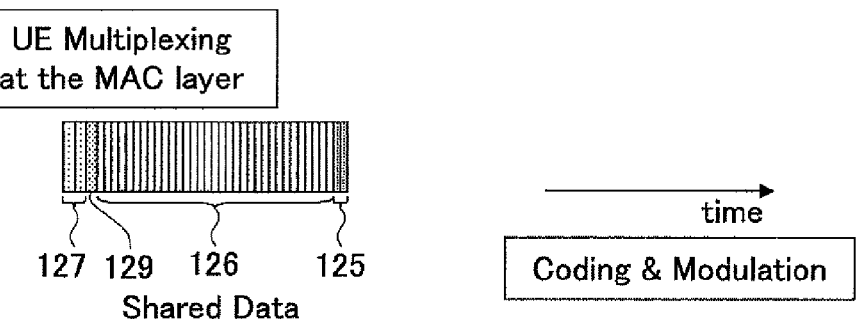
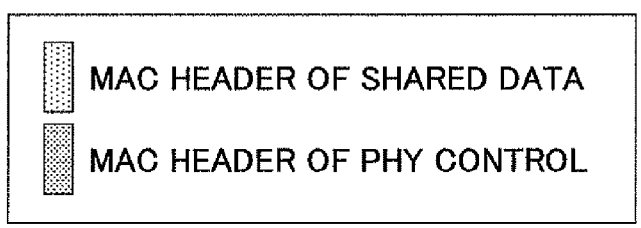

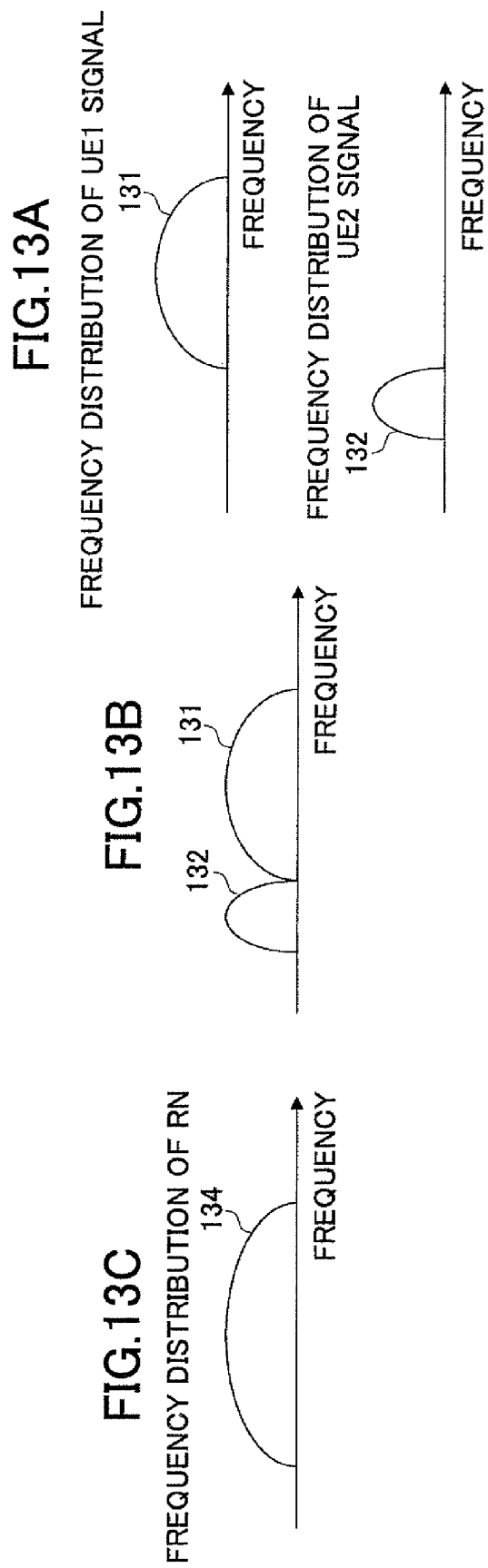

US 8,660,058 B2

RELAY NODE, BASE STATION, AND USER EQUIPMENT FOR WIRELESS COMMUNICATIONS NETWORK

CROSS-REFERENCE TO RELATED APPLICATIONS

This application is a U.S. continuation application filed under 35 USC 111(a) claiming benefit under 35 USC 120 and 365 (c) of PCT application JP 2009/056669, filed on Mar. 31, 2009. The foregoing application is hereby incorporated herein by reference.

FIELD

The embodiments discussed herein are related to a relay node, a base station, and a user equipment, for a wireless communications network.

BACKGROUND

In a mobile communications network, there are problems such as areas in which radio waves are heavily attenuated due to blockage of buildings or areas in which radio waves cannot be detected due to distant base stations. In order to solve the problems, standardization of a relay node is discussed in, for example, IEEE 802.16j, IEEE802.16m, LTE-Advanced.

Various types of relay nodes are being considered. The relay nodes can be broadly categorized into two types. The first type is an AF (Amplitude and Forward) type which performs relay while preventing delay by adding an amplitude amplifier. The second type is a DF (Decode and Forward) type which performs relay after decoding data and performing error correction on the decoded data.

FIG. 1 is a schematic diagram illustrating a wireless communications network system 100 according to a related art example. In the wireless communications network system 100, signals transmitted from plural user equipments UE1, UE2 are multiplexed by a relay node RN during uplink (UL) communication and re-transmitted to a base station BS.

FIG. 1 also illustrates the frequency distribution of the signals transmitted by the user equipments UE1, UE2, and the relay node RN, respectively. The user equipments UE1, UE2 transmit signals with a single carrier. The signals transmitted from the user equipments UE1, UE2 are combined (synthesized) with a multicarrier.

Patent Document 1: Japanese Laid-Open Patent Publication No. 2006-295778
Patent Document 2: Japanese Laid-Open Patent Application No. 2000-31876

When signals are transmitted by the multicarrier, the signals are not transmitted with constant amplitude in a time domain. This leads to a problem of PAPR (Peak to Average Power Ratio). As a result, wireless usage efficiency is degraded.

SUMMARY

According to an aspect of the invention, there is provided a relay node includes a processor that determines, based on uplink scheduler information, a target frequency band from plural frequency bands assigned to signals received from plural user equipments and multiplexes the signals received from the plural user equipments and a wireless communication interface that transmits the signals as a single carrier signal to a base station based on the target frequency band.

The object and advantages of the invention will be realized and attained by means of the elements and combinations particularly pointed out in the claims.

It is to be understood that both the foregoing generation description and the followed detailed description are exemplary and explanatory and are not restrictive of the invention, as claimed.

BRIEF DESCRIPTION OF DRAWINGS

FIG. 1 is a schematic diagram illustrating a wireless communications network system according to a related art example;

FIG. 2 is a schematic diagram illustrating a wireless communications network system according to an embodiment of the present invention;

FIGS. 3A-3C are schematic diagrams for describing a first relay method according to an embodiment of the present invention;

FIGS. 4A-4C are schematic diagrams for describing a second relay method according to an embodiment of the present invention;

FIGS. 5A-5C are schematic diagrams for describing a modified example of the second relay method according to an embodiment of the present invention;

FIGS. 6A-6D are schematic diagrams for describing another modified example of the second relay method according to an embodiment of the present invention;

FIGS. 7A-7C are schematic diagrams for describing a third relay method according to an embodiment of the present invention;

FIGS. 8A-8C are schematic diagrams for describing a fourth relay method according to an embodiment of the present invention;

FIGS. 12A-12C are schematic diagrams for describing another example of a multiplexing method where re-mapping is performed in a MAC layer according to an embodiment of the present invention;

FIGS. 13A-13C is for describing conversion of a coding rate before and after a relay process according to an embodiment of the present invention;

DESCRIPTION OF EMBODIMENTS

Figure 9A:
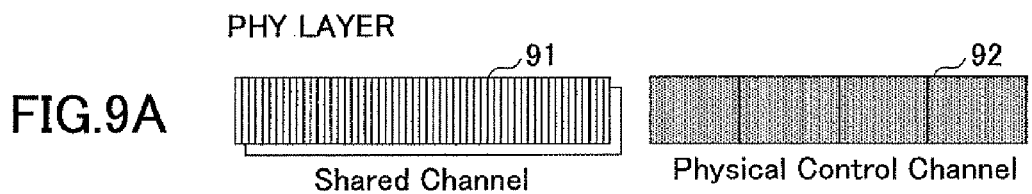
FIGS. 9A-9E are schematic diagrams for describing an example of a multiplexing method where re-mapping is performed in a physical layer according to an embodiment of the present invention.

In the following, embodiments of the present invention are described with reference to the accompanying drawings.

The embodiments of the present invention can be applied to, for example, IEEE802.16j, IEEE802.16m, LTE-Advanced.

FIG. 2 is a schematic diagram illustrating a wireless communications network system 200 according to an embodiment of the present invention. Similar to the wireless communications network 100 illustrated in FIG. 1, signals transmitted from plural user equipment apparatuses (hereinafter also simply referred to as "user equipment") UE1, UE2 are multiplexed and re-transmitted to a base station apparatus (hereinafter also simply referred to as "base station") BS by a relay node apparatus (hereinafter also simply referred to as "relay node") RN during uplink (UL) communication in the wireless communications network 200 illustrated in FIG. 2.

Because the relay node RN maps the signals received from all of the user equipment UE to a single transport block and relays the mapped signals to the base station with a single carrier, the problem of PAPR (Peak to Average Power Ratio) can be resolved. In this embodiment, the relaying with a single carrier can be achieved by multiplexing the signals from the user equipments UE1, UE2 at a MAC layer and mapping the multiplexed signals to a single transport block.

Next, with reference to FIG. 3 to FIG. 8, there is described the rules that are followed by a relay node RN for attaining a transmission band when the relay node RN relays signals with a single carrier.

In the following description of the embodiments, scheduling functions are integrated at the base station BS unless described as otherwise. Accordingly, each of the user equipments UE transmits data to the relay node RN in accordance with scheduler control signals from the base station BS. The relay node RN and the base station BS transmit and receive data between each other based on a certain rule and a below-described algorithm without performing any explicit signaling. By applying a common rule for reception and transmission, the amount of control information can be reduced.

As a basic rule, a frequency band used when relaying signals from the relay node RN to the base station BS is selected from a frequency band(s) used when transmitting signals from the user equipment UE to the relay node RN.

FIGS. 3A-3C are schematic diagrams for describing a first relay method according to an embodiment of the present invention. FIG. 3A illustrates single carrier frequency bands 31, 32 transmitted by the user equipments UE1, UE2, respectively. FIG. 3B illustrates a frequency band received by the relay node RN.

In the first relay method, a frequency band to be used for relaying signals from the relay node RN to the base station BS is selected from the frequency bands 31, 32. Then, the combination of modulation and channel coding scheme (MCS, Modulation and channel Coding Scheme) is changed.

The relay node RN analyzes the uplink scheduling information transmitted from the base station BS to the user equipments UE1, UE2 beforehand, so that the relay node RN can determine which frequency band to use for relay before receiving information from the user equipments UE1, UE2.

With the first relay method, the relay node RN compares the frequency bands 31, 32 assigned to the user equipments UE1, UE2 and uses the frequency band having a widest bandwidth (in this example, the frequency band having the widest bandwidth is the frequency band 31 of the user equipment UE1 as illustrated in FIG. 3C) for relaying signals to the base station BS. Because the first relay method sorts the frequency bands assigned to the user equipments UE1, UE2 in an order based on the size (bandwidth) of the frequency bands and extracts the frequency band having the widest bandwidth, the first relay method has an advantage of being able to perform controls with an extremely simple algorithm.

FIGS. 4A-4C are schematic diagrams for describing a second relay method according to an embodiment of the present invention. FIG. 4A illustrates single carrier frequency bands 41, 42 transmitted by the user equipments UE1, UE2, respectively. FIG. 4B illustrates a frequency band received by the relay node RN.

With the second relay method, the relay node RN determines whether there are any adjacent frequency bands assigned to the user equipments UE1, UE2. In a case where the relay node RN determines that the frequency bands assigned to the user equipments UE1, UE2 are adjacent to each other (in this example, frequency bands 41, 42), the relay node RN bundles (combines) the frequency bands 41, 42 to obtain a frequency band 43 having wider bandwidth (as illustrated in FIG. 4C) to be used for relay. Then, the combination of modulation and channel coding scheme (MCS, Modulation and channel Coding Scheme) is changed.

FIGS. 5A-5C are schematic diagrams for describing a modified example of the second relay method according to an embodiment of the present invention. In the modified example of the second relay method, the rule for performing the bundling frequency bands not only applies to bundling single carrier frequency bands but also applies to bundling together a single carrier frequency band 51 of the user equipment UE1 and an OFDM (Orthogonal Frequency Division Multiplex) frequency band 52 of the user equipment UE2 as illustrated in FIG. 5A. Thereby, a frequency band 53 having a wider bandwidth can be obtained (as illustrated in FIG. 5C) to be used for relay. Then, the combination of modulation and channel coding scheme (MCS, Modulation and channel Coding Scheme) is changed. Accordingly, the relay node RN can relay signals as a single carrier.

FIGS. 6A-6D are schematic diagrams for describing another modified example of the second relay method according to an embodiment of the present invention. FIG. 6A illustrates single carrier frequency bands 61-64 transmitted by the user equipments UE1-UE4, respectively. FIG. 6B illustrates a frequency band received by the relay node RN. The relay node RN bundles (combines) adjacent frequency bands 61, 62 and adjacent frequency bands 63, 64. Thereby, frequency bands 65, 66 are obtained as illustrated in FIG. 6C. Then, the frequency band having a widest bandwidth (in this example, the frequency band 65 as illustrated in FIG. 6D) is selected from the frequency bands 65, 66 to be used for relay. Then, the combination of modulation and channel coding scheme (MCS, Modulation and channel Coding Scheme) is changed, to thereby, relay signals to the base station BS.

Although the other modified example of the second relay method may be complicated compared to the above-described relay methods, the other modified example of the second relay method can use available frequency bands more efficiently. Accordingly, the other modified example of the second relay method can significantly improve wireless communication characteristics.

FIGS. 7A-7C are schematic diagrams for describing a third relay method according to an embodiment of the present invention. FIG. 7A illustrates single carrier frequency bands 71, 72 transmitted by the user equipments UE1, UE2 and an OFDM frequency band transmitted by the user equipment UE3, respectively. In order to attain a bundled frequency band having the widest bandwidth, the base station BS performs scheduling and signaling with respect to the user equipments UE1-UE3 so that the frequency bands 71-73 of the UE1-UE3 to be used for relay become adjacent to each other. The signaling may be designated each time by a scheduler of the base station BS, notified with control signals at the MAC layer, or notified with control signals at an upper layer such as the RRC (Radio Resource Control) layer. The signaling is described in further detail below.

By performing the signaling beforehand and accumulating the bandwidths of the frequency bands of the user equipments, the relay node RN can determine the frequency band to be used with a simple algorithm and the usage efficiency of the frequency bands can be maximized.

FIGS. 8A-8C are schematic diagrams for describing a fourth relay method according to an embodiment of the present invention. With the fourth relay method, not only the frequency bands assigned to the user equipments UE1, UE2 are bundled (combined) but also the physical control channels of the user equipments UE1, UE2 are bundled (combined), to thereby attain a frequency band with a wider bandwidth.

In this example, the user equipment UE1 uses a band of a shared channel (shared channel band) 81 and the user equipment UE2 uses a band of a physical control channel (physical control channel band) 82 as illustrated in FIG. 8A. FIG. 8B illustrates a frequency band received by the relay node RN.

As illustrated in FIGS. 8B and 8C, the relay node RN disassembles the physical control channel 82 into a physical control channel indicated with reference numeral 84 and re-maps the disassembled physical control channel to the shared channel 83.

The response speed of the control signals of the physical control channel of the physical layer may be increased by not encoding the control signals of the physical control channel. Alternatively, the control signals of the physical control channel may be subject to encoding to a certain degree so that noise resistance can be improved. Various multiplexing methods may be applied depending on the information to be multiplexed after the frequency bands are bundled.

Next, FIGS. 9A to 12C illustrate exemplary methods of mapping control signals of a physical layer where aspects such as response speed or error correction precision are taken into consideration.

FIGS. 9A-9E are schematic diagrams for describing an example of a multiplexing method where re-mapping is performed in the physical layer. The multiplexing method illustrated with FIGS. 9A-9E focuses particularly on response speed. The multiplexing method of FIGS. 9A-9E is for relaying control signals of the physical layer as fast as possible.

FIG. 9A illustrates an example where the relay node RN receives signals from each of the user equipments UE1, UE2 in which two shared channels 91 and one physical control channel 92 for control signals of the physical layer are used.

Figure 9B:
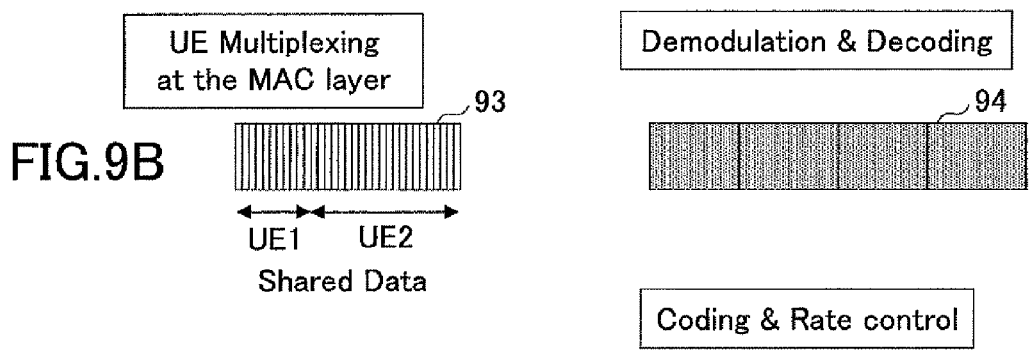

Then, as illustrated in FIG. 9B, multiplexing of the user equipments UE1, UE2 is performed on demodulated/decoded shared channel data of the shared channels 93 at the MAC layer. On the other hand, a demodulation process (0/1 determination process) is performed on digital signals of the physical control channel. According to necessity, a decoding process may also be performed on the digital signals of the physical control channel.

Figure 9C:
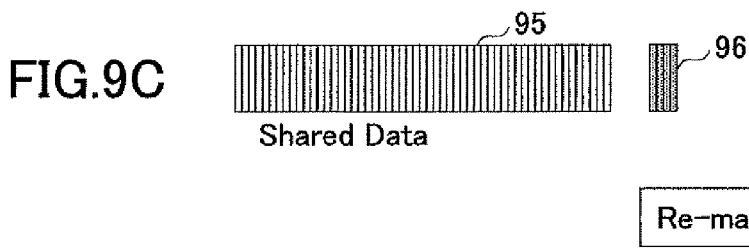

Then, as illustrated in FIG. 9C, the multiplexed signals of the shared channel are encoded and converted to signals 95 having a symbol rate corresponding to the communication band. On the other hand, the signals of the physical control channel are subject to rate conversion and converted to signals 96 having a symbol rate corresponding to the communication band. In a case where the decoding process is performed on the signals of the physical control signals in FIG. 9B, a coding process is performed on the signals of the physical control signals.

Figure 9D:
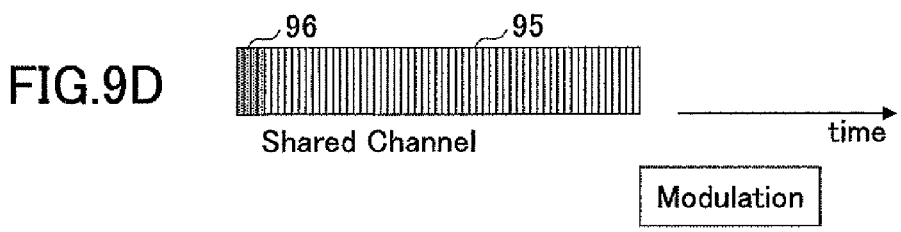
Figure 9E:
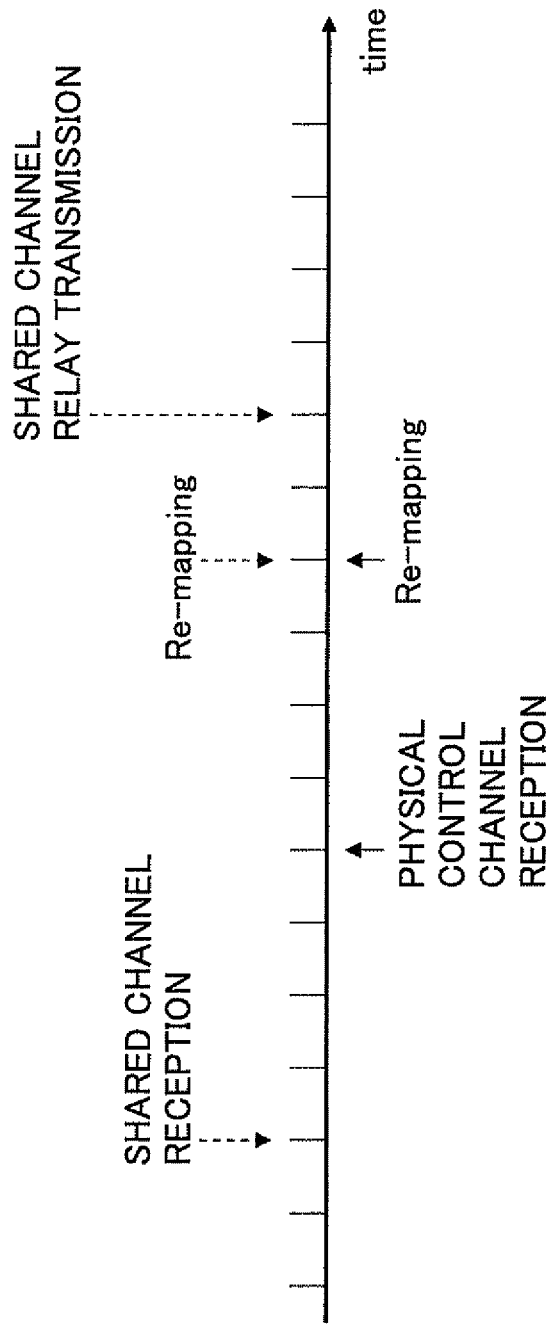

Then, as illustrated in FIG. 9D, a re-mapping process is performed so that the signals of the shared channel and the signals of the physical control channel are mapped to a single shared channel. Then, after modulating the signals of the shared channel, the relay node RN relays the modulated signals as single carrier signals.

Although the control information of the physical layer (corresponding to reference numeral 96) is allocated at the front of the signal in FIG. 9D, the control information of the physical layer may be allocated at the rear of the signal. The method of allocating the control information of the physical layer may be determined beforehand.

With reference to the example illustrated in FIG. 9A, it is to be noted that the shared channel 91 and the physical control channel 92 are assumed to be signals that are received at the same time by the relay node RN. However, even in a case where signals of the shared channel and signals of the physical control channel are received at different timings, the relay node RN may perform re-mapping for such signals may be performed at the same time and relayed. This is because a delay may occur in, for example, a decoding process of the signals of the shared channel or a multiplexing or coding process of the signals of the shared channel at the MAC layer. This is also because preferable to shorten process time as much as possible since signals of the physical control channel pertains to control information. Accordingly, as illustrated in FIG. 9B, the relay node RN may, for example, multiplex the signals of the physical control channel with signals of the shared channel received at a timing before the reception of the signals of the physical control signals and relay (transmit) the multiplexed signals.

Figure 10A:
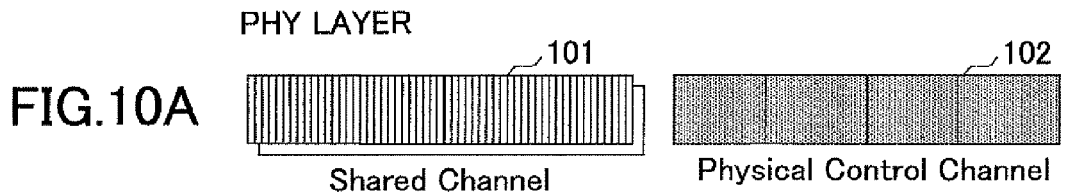
FIGS. 10A-10C are schematic diagrams for describing another example of a multiplexing method where re-mapping is performed in a physical layer according to an embodiment of the present invention.
Figure 10B:
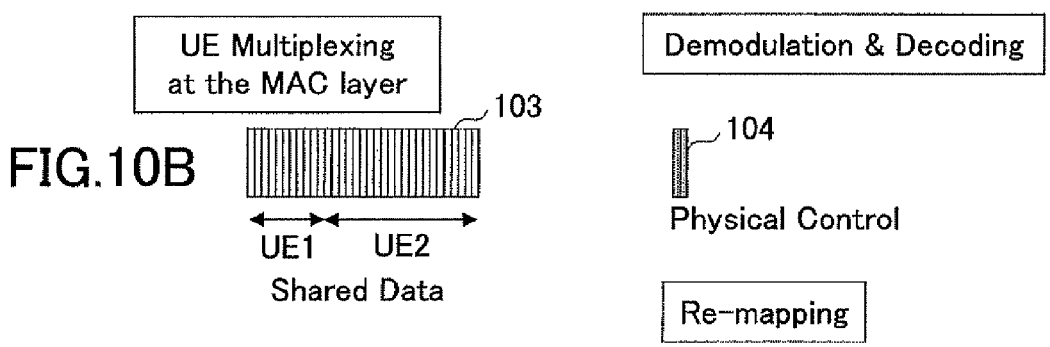
Figure 10C:
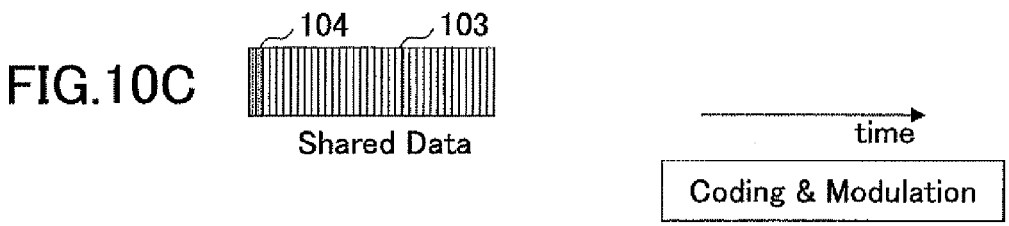

FIGS. 10A-10C are schematic diagrams for describing another example of a multiplexing method where re-mapping is performed in the physical layer. The multiplexing method illustrated with FIGS. 10A-10C focuses on encoding. The multiplexing method of FIGS. 10A-10C is for relaying control signals of the physical layer with the least amount of errors as possible.

FIG. 10A illustrates an example where the relay node RN receives signals from each of the user equipments UE1, UE2 in which two shared channels 101 and one physical control channel 102 for control signals of the physical layer are used.

Then, as illustrated in FIG. 10B, multiplexing of the signals of the user equipments UE1, UE2 is performed on demodulated/decoded shared channel data of the shared channels 103 at the MAC layer. On the other hand, a physical control signal(s) 104 is generated after performing demodulation on the received signals of the physical control channel 102 (and decoding the received signals in a case where the received signals are encoded).

Then, as illustrated in FIG. 10C, when the signals 103 multiplexed at the MAC layer are returned to the physical layer, the returned multiplexed signals 103 are multiplexed with the demodulated signals of the physical control layer 104

As for the method of multiplexing the signals of the shared channel and the signals of the physical control channel, shared channel data may be re-mapped after signals of the physical control channel prior to being encoded are allocated to the front of the signal of the shared channel data.

Alternatively, the signals of the physical control channel may be allocated to the rear of the signals of shared channel data. The method of allocating the signals of the physical layer may be determined beforehand.

Then, after multiplexing the signals of the shared channel and the signals of the physical control channel, data of each user equipment UE and control data of the physical layer are encoded and modulated together as a whole. Then, the encoded and modulated data are relayed to the base station.

By multiplexing the signals of the physical control channel with the signals of the shared channel, code length can be significantly increased. Thereby, coding gain can be increased.

Although the response speed of the multiplexing method of FIGS. 10A-10C may be slower than the response speed of the multiplexing method of FIGS. 9A-9E, the response speed of the control signal of the physical layer can be increased as illustrated in FIG. 9B.

Figure 11A:
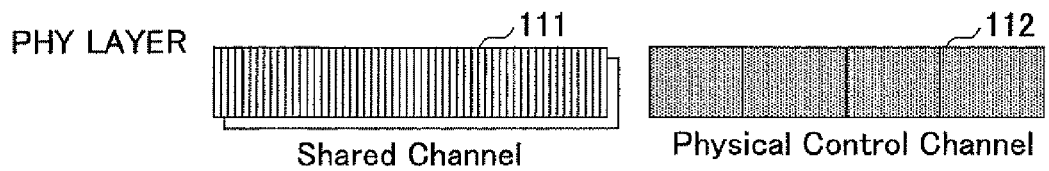
FIGS. 11A-11C are schematic diagrams for describing an example of a multiplexing method where re-mapping is performed in a MAC layer according to an embodiment of the present invention.
Figure 11B:
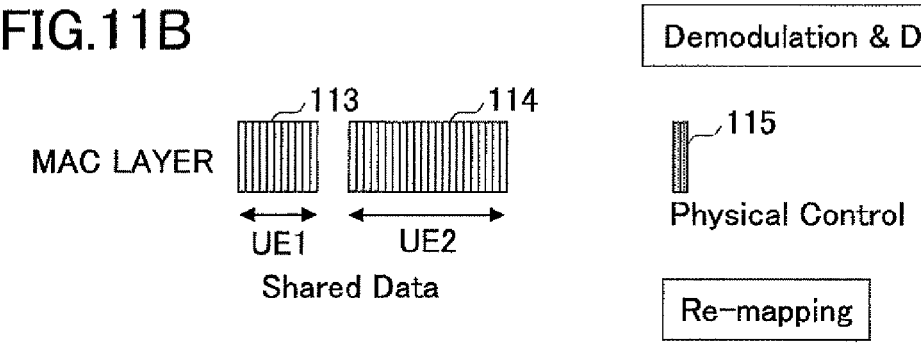
Figure 11C:
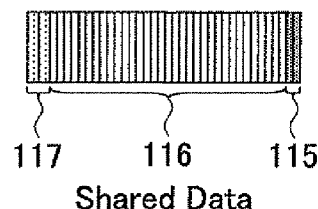

FIGS. 11A-11C are schematic diagrams for describing an example of a multiplexing method where re-mapping is performed in the MAC layer. The multiplexing method illustrated with FIGS. 11A-11C focuses on encoding. The multiplexing method of FIGS. 11A-11C is for relaying control signals of the physical layer with the least amount of errors as possible. The multiplexing method of FIGS. 11A-11C is different from the multiplexing method of FIGS. 10A-10C in that the re-mapping process is performed at the MAC layer.

FIG. 11A illustrates an example where the relay node RN receives signals from each of the user equipments UE1, UE2 which include signals from two shared channels 111 and signals from one physical control channel 112 (i.e. control signals of the physical layer).

Then, as illustrated in FIG. 11B, demodulated/decoded signals of the shared channel (shared data) 113, 114 are carried to the MAC layer. On the other hand, after signals of the physical control channel are demodulated (and decoded if the demodulated signals are encoded), the demodulated (and decoded) signals of the physical control channel 115 are carried to the MAC layer.

Then, as illustrated in FIG. 11C, the signals 113, 114 of the shared channel and the signals 115 of the physical control channel are multiplexed at the MAC layer. A MAC header 117 is attached to the multiplexed signals of the shared channel data of the user equipments UE1, UE2 whereas no MAC header is attached to the signals of the physical control channel 115. In this case, the signals 115 of the physical control channel, which initially do not belong in the MAC layer, are allocated at the rear of the shared channel data in the MAC layer.

The shared channel data can be received if it is determined beforehand that the receiving side is to extract the MAC header, then extract a MAC service data unit (MAC_SDU) corresponding to the MAC header, and then recognize that last remaining data as data containing physical control data.

Then, the signals multiplexed at the MAC layer are returned to the physical layer. Then, after encoding/modulating the multiplexed signals, the encoded/modulated signals are relayed to the base station BS.

FIGS. 12A-12C are schematic diagrams for describing another example of a multiplexing method where re-mapping is performed in the MAC layer. The multiplexing method illustrated with FIGS. 12A-12C focuses on encoding. The processes of FIGS. 12A-12B are substantially the same as the processes of FIGS. 11A-11B. That is, the method of FIGS. 12A-12C is substantially the same as the method of FIGS. 11A-11C until the multiplexing process at the MAC layer.

As illustrated in FIG. 12C, in a case where the multiplexed signals 126, the MAC header 127 of the shared channel data, and the signals 125 of the physical control channel are multiplexed at the MAC layer, a MAC header 129 is prepared for multiplexing the control signals of the physical layer (signals of the physical control channel 125) which initially do not belong in the MAC layer. That is, the method of FIGS. 12A-12C is different from the method of FIGS. 11A-11C in that the MAC header 129 is used to explicitly indicate the multiplexing of the control signals of the physical layer. Then, the signals multiplexed at the MAC layer are returned to the physical layer. Then, after encoding/modulating the multiplexed signals, the encoded/modulated signals are relayed to the base station BS.

By using the examples of the relay methods described with FIGS. 9A-12C, the frequency band to be used before relaying by the relay node RN changes to the frequency band to be used after relaying by the relay node RN. In addition, the quality of the radio transmission path between the user equipment UE and the relay node RN is different from the quality of the radio transmission path between the relay node RN and the base station BS. Thus, by using the relay method according to an embodiment of the present invention, relay can be performed without performing any particular signaling between the relay node RN and the base station BS.

FIGS. 13A-13C is for describing conversion of a coding rate before and after a relay process according to an embodiment of the present invention.

FIG. 13A illustrates the frequency bands 131, 132 of the signals transmitted from each of the user equipments UE1, UE2 to the relay node RN according to an embodiment of the present invention. In this embodiment, the amount of data transmitted from the user equipment UE1 using the frequency band 131 is assumed to be a transport block size (TBS) equivalent to data amount "A". The amount of data transmitted from the user equipment UE2 using the frequency band 132 is assumed to be a transport block size (TBS) equivalent to data amount "B".

Accordingly, in this embodiment, the relay node RN is to relay the combined data amount (A+B) to the base station BS. Further, the frequency band 134 that can be used by the relay node (RN) has the bandwidth described above with reference to FIGS. 3A-8C. The coding rate for MCS (Modulation and channel Coding Scheme) is determined by using a MCS_configuration (MCS_config) as an index indicated with the following Formula 1.

[FORMULA 1]

$$MCS\_config = \frac{(A+B)}{BW} \quad (1)$$

For example, in a case where there is an increase/decrease of data γ, for example, in the header during a multiplexing process between the signals of the user equipment UE1 and the user equipment UE2 or a case where signaling is performed between the relay node RN and the base station BS, an index indicated with the following Formula 2 is used to determine the coding rate for MCS.

[FORMULA 2]

$$MCS\_config = \frac{(A+B+\gamma)}{BW} \quad (2)$$

The MCS_config is converted by using the following conversion table.

TABLE 1

MCS_config CONVERSION TABLE

| MCS_config = x | MODULATION DEPTH | CODING RATE |
|---|---|---|
| 0 ≤ x < 0.33 | QPSK, SIMO | R = 1/6 |
| 0.33 ≤ x < 0.4 | QPSK, SIMO | R = 1/5 |
| ... | ... | ... |
| 10.2 ≤ x < 10.8 | 64QAM, MIMO (X2) | R = 9/10 |

For example, in a case of MCS_config=x=0.35, the coding rate R is 1/5 because the modulation type is QPSK. Because the coding rate R is 1/5 in a case of QPSK (2 bit/symbol/stream) or SIMO (1 stream), data transmission efficiency for a single transmission with a selected MCS is 2/5=0.4.

The difference of data transmission efficiency between the Formula (1) or (2) and data transmission efficiency of the selected MCS is adjusted by using, for example, padding data during a coding process. Assuming that the amount of padding data is indicated as "P", "P" can be obtained by the following formulas.

[FORMULA 3]

$$\frac{(A+B+P)}{BW} = R \quad (3)$$

Accordingly,

[FORMULA 4]

$$P = R \times BW - (A+B) \quad (4)$$

Next, embodiments of a base station (BS), a relay node (RN), and a user equipment (UE) used for performing the above-described relay methods are described.

Figure 14:
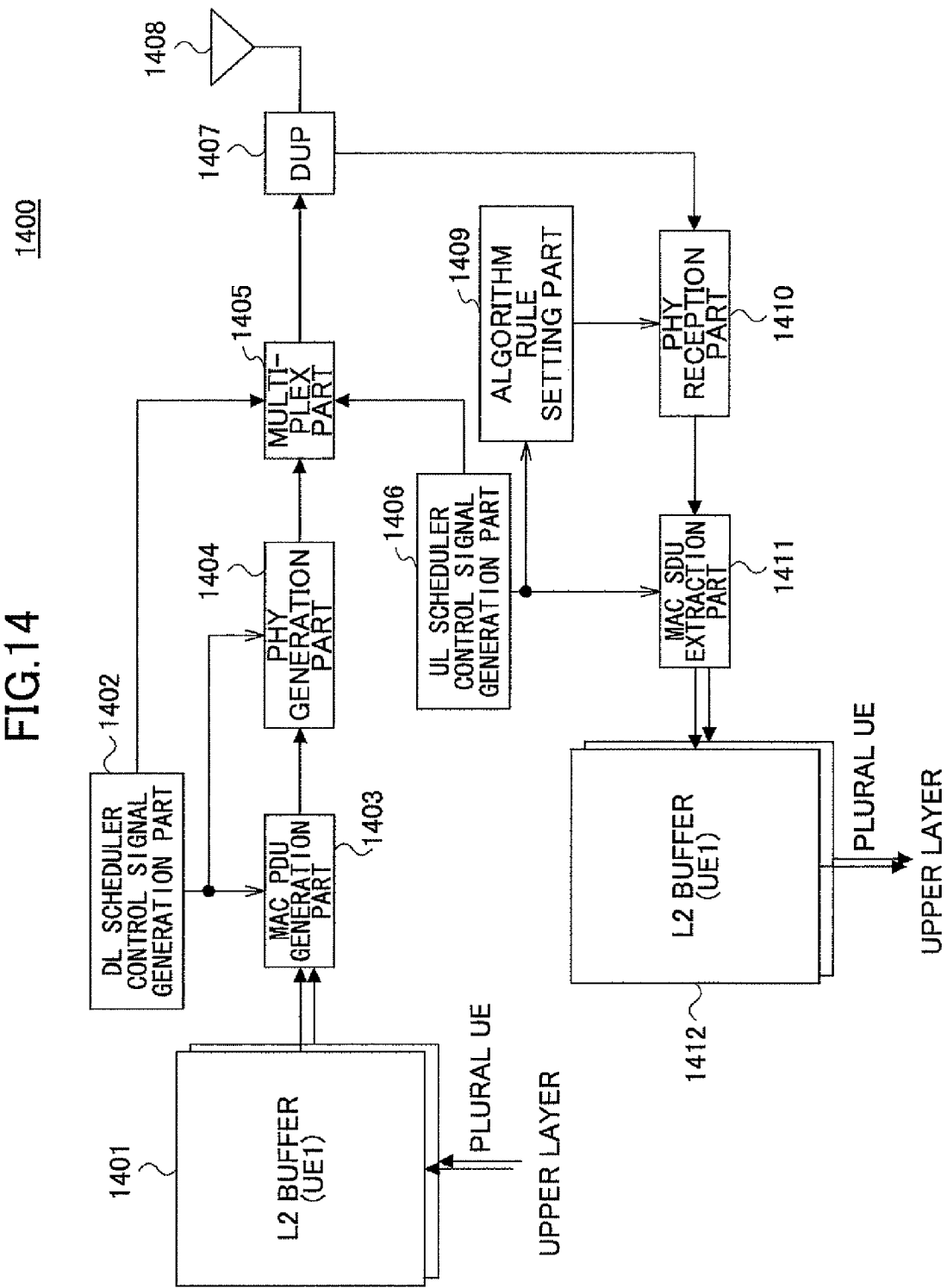
FIG. 14 is a schematic diagram illustrating a configuration of a base station according to an embodiment of the present invention.

FIG. 14 is a schematic diagram illustrating a configuration of a base station 1400 according to an embodiment of the present invention. The base station 1400 is used in the first and second relay methods.

In this embodiment, a frequency resource between a relay node (RN) and the base station (BS) 1400 is obtained from one of the frequency bands assigned to the user equipments (UE) in accordance with an operation of an uplink (UL) scheduler.

First, an example of an operation performed in the downlink (DL) side of the base station 1400 is described.

Control signals generated at an upper layer or information signals transferred from a network are stored in correspondence with each UE inside a layer 2 buffer (L2 buffer) 1401 of the base station 1400.

Then, in accordance with an algorithm of a DL scheduler control signal generation part 1402, information is read out from the layer 2 buffer 1401. Based on the read out information, the MAC_PDU generation part 1403 generates a MAC protocol data unit (MAC_PDU) in a transmission format instructed by the DL scheduler control signal generation part 1402. Based on the generated MAC protocol data unit (MAC_PDU), a PHY generation part 1404 generates a PHY signal(s).

Then, a multiplex part 1405 multiplexes control signals of the DL scheduler control signal generation part 1402 and signals of a MAC_PDU including control data generated from the UL scheduler control signal generation part 1406. Then, the multiplexed signals are transmitted from an antenna 1408 via a duplexer (DUP) 1407.

Next, information received in the uplink (UL) side of the base station 1400 is described.

Signals received by the antenna 1408 are transmitted through the duplexer 1407. Then, an algorithm rule setting part 1409 obtains an algorithm rule based on control signals from an UL scheduler control signal generation part 1406 and uses a setting value of a user equipment to be received for setting a PHY reception part 1410. In accordance with the settings by the algorithm rule setting part 1409, the PHY reception part 1410 demodulates/decodes signals of the PHY channel.

Then, a MAC_SDU extraction part 1411 separates the demodulated/decoded signals (data) in correspondence with each of the user equipments (UE) and stores the data of each user equipment (UE) in a corresponding layer 2 buffer (L2 Buffer) 1412. Then, after conditions for transferring data to the upper layer are met, the data of each of the user equipments (UE) is transferred to a control part of the base station 1400 or a network.

In a case where control signals of the physical layer notified from the user equipment (UE) are included in the received signals, the PHY reception part 1410 receives the control signals of the physical layer. Details in how the control signals of the physical layer are received and processed are explained below with reference to FIGS. 28-30.

Figure 15:
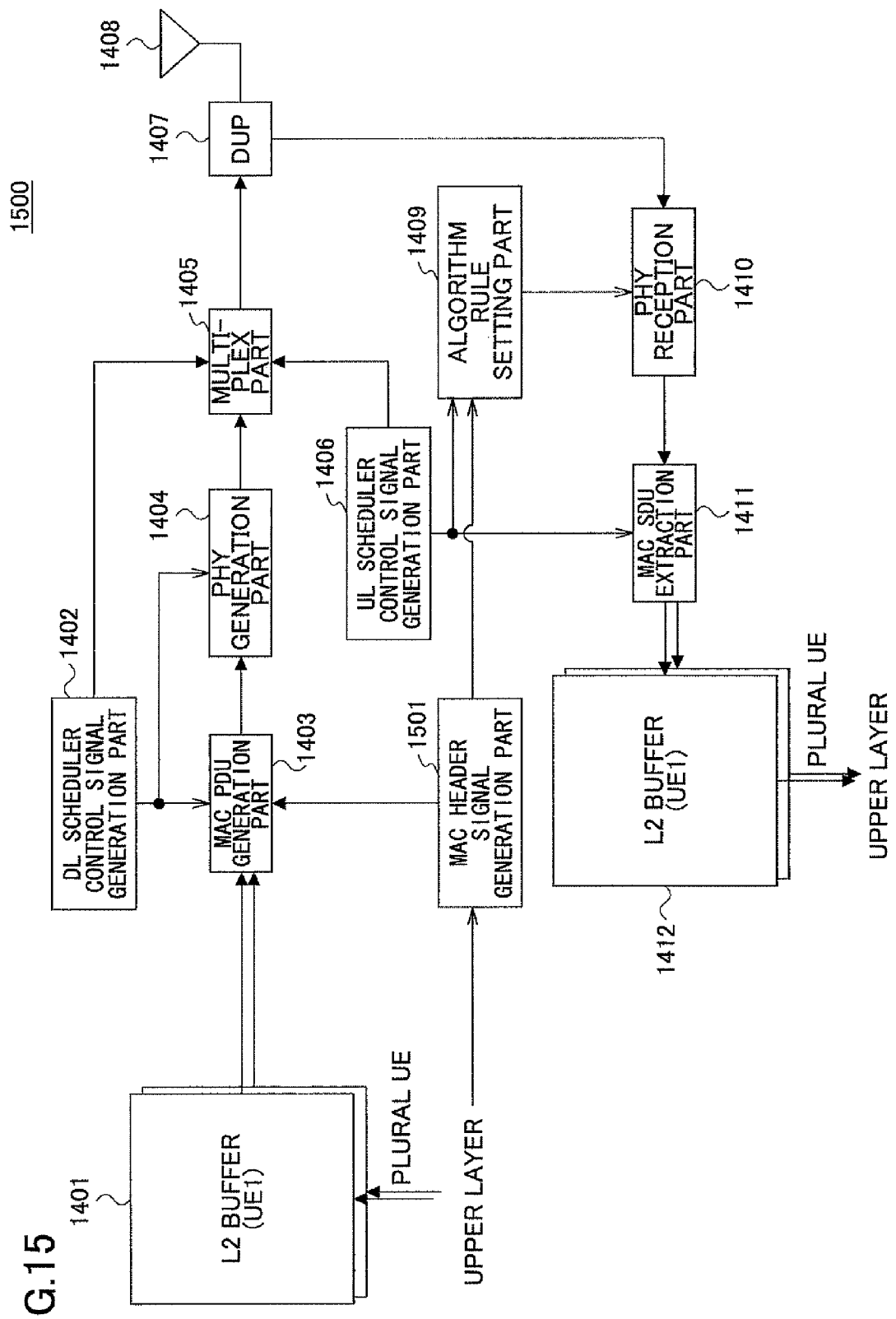
FIG. 15 is a schematic diagram illustrating a configuration of a base station according to an embodiment of the present invention.

FIG. 15 is a schematic diagram illustrating a configuration of a base station 1500 according to an embodiment of the present invention. The base station 1500 is used for the relay method (a case of MAC signaling) described above with reference to FIGS. 7A-7C. The base station 1500 is different from the base station 1400 in terms of the following aspects.

The base station 1500 performs MAC signaling with respect to the user equipment (UE) via the relay node RN. In performing the MAC signaling, a MAC header signal generation part 1501 generates a MAC header signal and sets beforehand (presets) a portion of scheduling information into the generated MAC header signal (MAC header). Then, the MAC header signal is multiplexed with a MAC_PDU generated by the MAC_PDU generation part 1403 when generating the MAC_PDU. Then, the multiplexed signal is transmitted from the antenna 1408 via the duplexer 1407.

As examples of a multiplexing method, there is a method performed by assigning a MAC_PDU of each user equipment and a method performed by gathering MAC signals of all of the user equipment with respect to the relay node RN and generating a MAC_PDU dedicated to the relay node RN. The former method requires decoding all of the signals at the relay node RN and determining whether there is a MAC signal. The latter method simply requires extraction of the MAC_PDU dedicated for the relay node RN and reading of the MAC signal assigned to the MAC_PDU dedicated to the relay node RN.

In the case of receiving uplink relay signals, the signals of UL scheduler information with MAC header signals from the MAC header signal generation part 1501 are combined and sent to the algorithm rule setting part 1409. The algorithm rule setting part 1409 obtains an algorithm rule based on the combined signals and demodulates/decodes the PHY signal included in the received signals by using the algorithm rule. Other than the above-described aspect, the functions and operations of the configuration illustrated in FIG. 15 is substantially the same as those of the configuration illustrated in FIG. 14.

Figure 16:
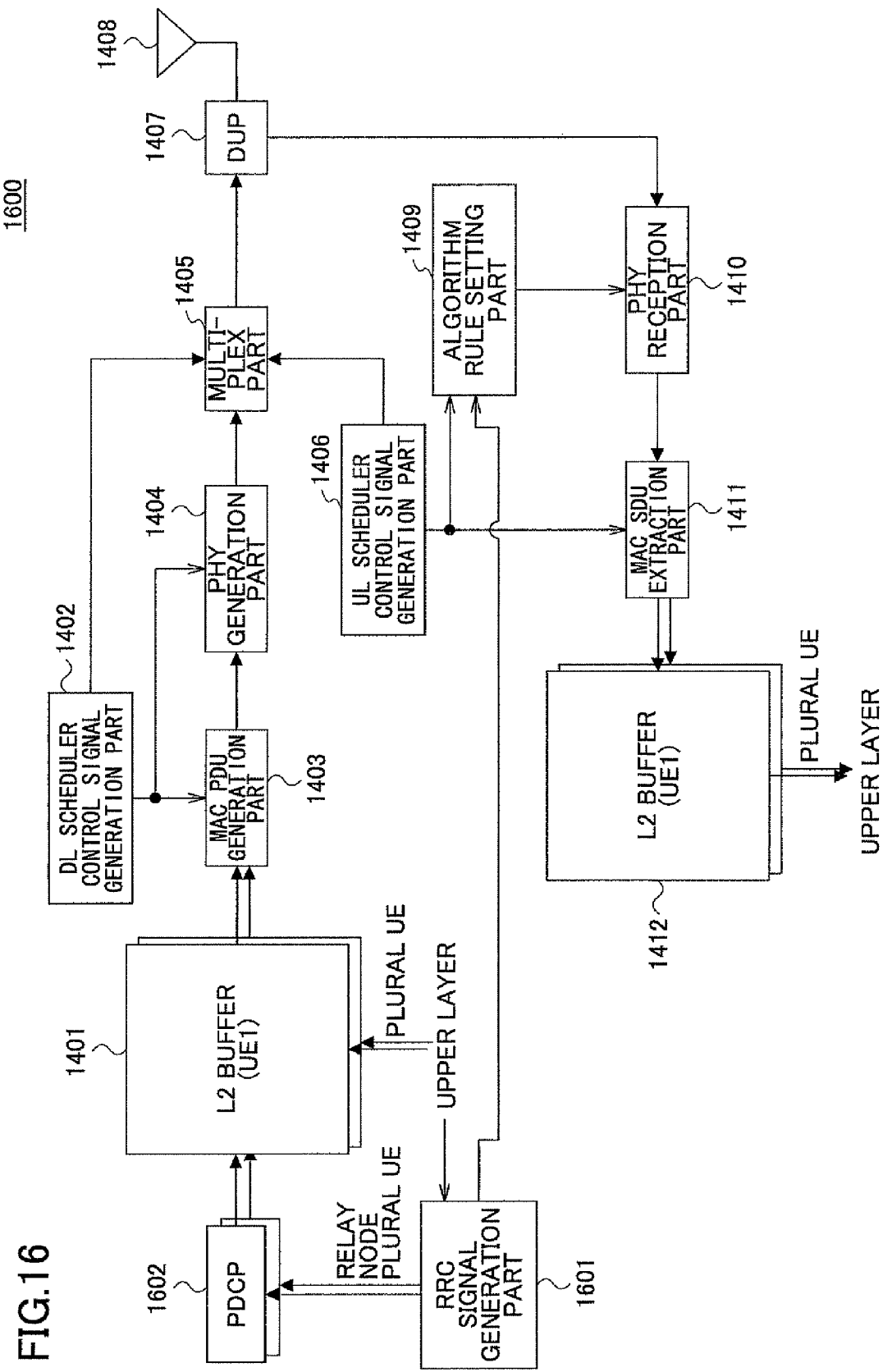
FIG. 16 is a schematic diagram illustrating a configuration of a base station according to an embodiment of the present invention.

FIG. 16 is a schematic diagram illustrating a configuration of a base station 1600 according to an embodiment of the present invention. The base station 1600 is used for the third relay method. The base station 1600 is different from the base station 1500 in terms of the following aspects.

In this embodiment, instead of performing the processes performed by the base station 1500 in a MAC signaling operation, the processes are performed by the base station 1600 in a RRC signaling operation. An RRC signal generation part 1601 generates signals of RRC scheduling information and sends the generated signals to the L2 buffer 1401 via a PDCP process part 1602. The RRC scheduling information from the RRC signal generation part 1601 is included in the MAC_PDU. Because signaling is performed in an upper layer, security functionality can be improved by having signals handled through the PDCP layer.

Because a security procedure is performed in each of the user equipments, the RRC scheduling information is notified to each of the user equipments. In addition, the RRC scheduling information of all the user equipments is notified to the relay node. Then, the RRC scheduling information is transmitted as control signals of the upper layer from the antenna 1408.

Further, in the case of receiving uplink relay signals, the signals of the UL scheduler information and the RRC signals generated from the RRC signal generation part 1601 are combined and sent to the algorithm rule setting part 1409. The algorithm rule setting part 1409 obtains an algorithm rule based on the combined signals and demodulates/decodes the PHY signal included in the received signals by using the algorithm rule. Other than the above-described aspect, the functions and operations of the configuration illustrated in FIG. 16 is substantially the same as those of the configuration illustrated in FIG. 14.

Figure 17:
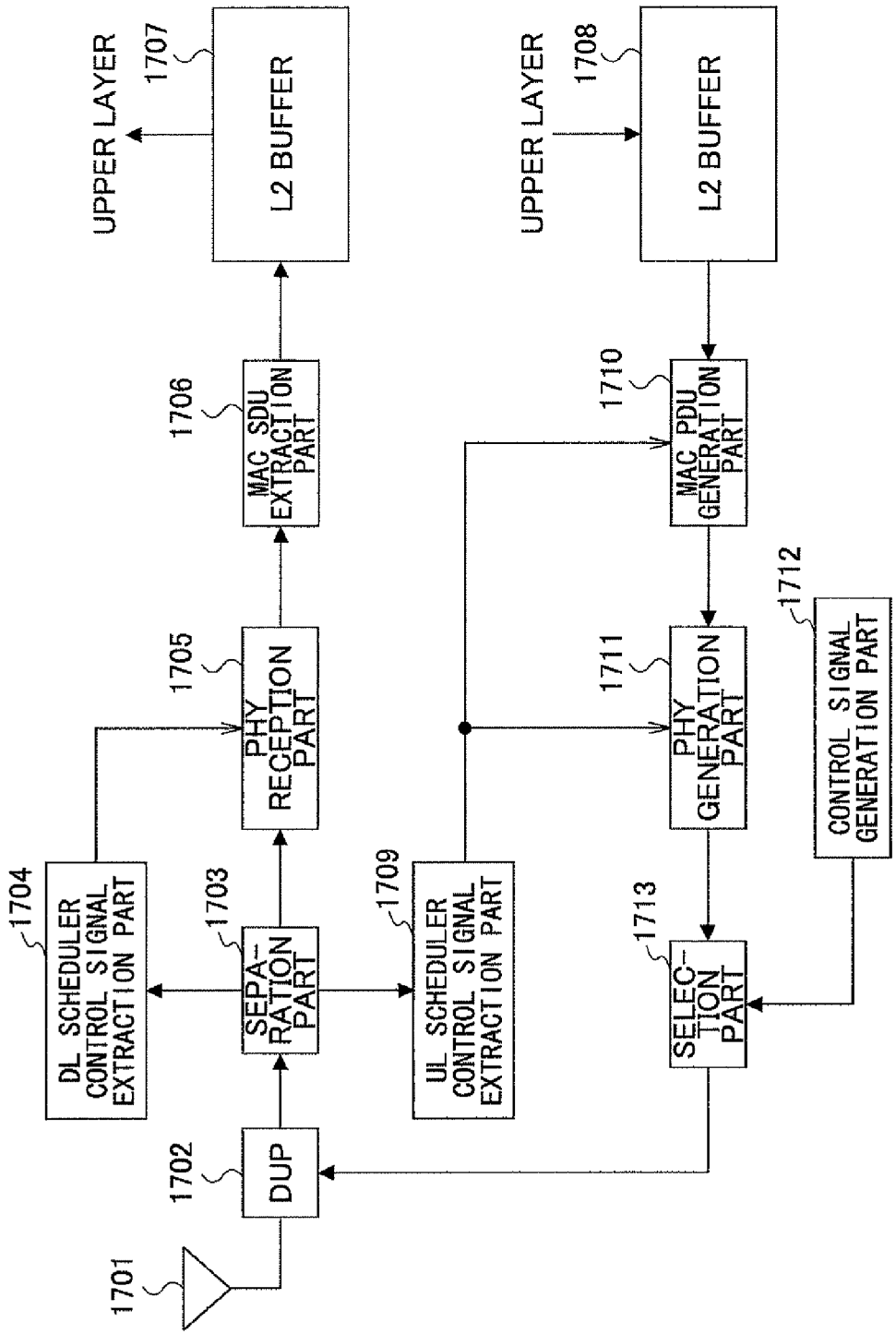
FIG. 17 is a schematic diagram illustrating a user equipment according to an embodiment of the present invention.

FIG. 17 is a schematic diagram illustrating a user equipment 1700 according to an embodiment of the present invention. The user equipment 1700 is used for the first and second relay methods.

First, an example of an operation performed in the downlink (DL) side of the user equipment 1700 is described.

Signals received by an antenna 1701 are transmitted through a duplexer 1703. Then, a DL scheduler control signal (s) is separated from other signals in the received signals by a separation part 1703 and extracted by a DL scheduler control extraction part 1704. In a case where information of the DL scheduler control signal includes information addressed to the user equipment 1700 itself, a PHY signal of the received signals is demodulated/decoded by a PHY reception part 1705, and a MAC_SDU is extracted by the MAC_SDU extraction part 1706. The data of the extracted MAC_SDU is stored in a L2 buffer 1707. Then, after conditions for transferring data to the upper layer are met, the data of the MAC_SDU is transferred to the upper layer.

Next, an example of an operation performed in the uplink (UL) side of the user equipment 1700 is described.

Data of the signals generated in the upper layer are stored in correspondence with each user equipment inside a layer 2 buffer 1708. Then, an UL scheduler control signal is extracted from D/L information by a separation part 1703 and a UL scheduler control signal extraction part 1709. In a case where information of the UL scheduler control signal includes resource information addressed to the user equipment 1700 itself, corresponding information is read out from the layer 2 buffer 1708. Based on the read out information, a MAC_PDU generation part 1710 generates a MAC_PDU. A PHY generation part 1711 generates a PHY signal from the MAC_PDU in a transmission format instructed by the UL scheduler control signal extraction part 1709. Then, the generated data is transmitted from the antenna 1701 via the duplexer 1702.

In a case where control signals for controlling the physical layer are defined, the control signals of the physical layer are generated at a predetermined timing by a control signal generation part 1712 and transmitted from the antenna 1701 via the duplexer 1702. Then, a selection part 1713 selects a PHY signal generated by the PHY generation part 1711 and a control signal generated by the control signal generation part 1712.

Figure 18:
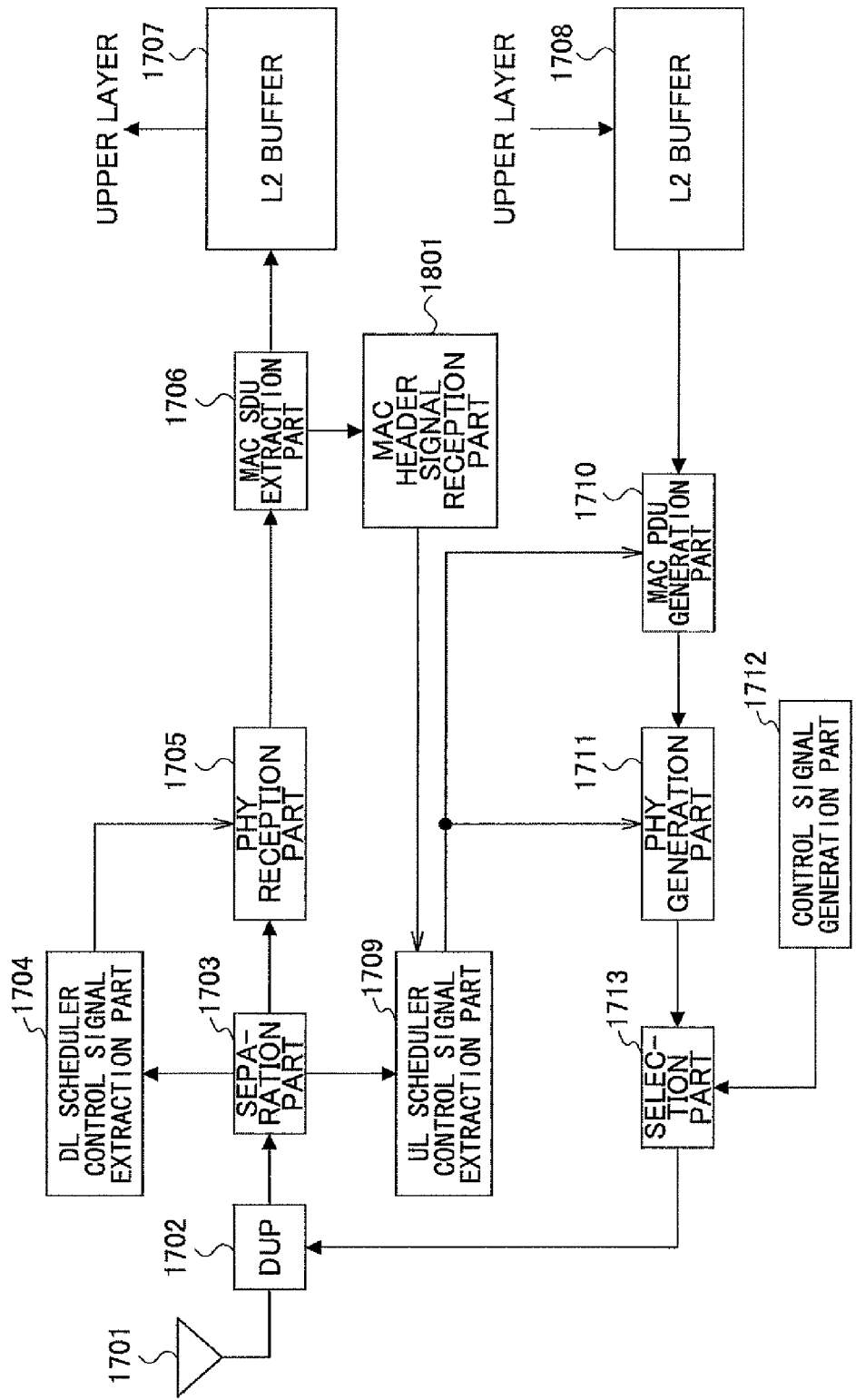
FIG. 18 is a schematic diagram illustrating a configuration of a user equipment according to an embodiment of the present invention.

FIG. 18 is a schematic diagram illustrating a configuration of a user equipment according to an embodiment of the present invention. The user equipment 1800 is used for the third relay method (a case of MAC signaling). The user equipment 1800 is different from the user equipment 1700 in terms of the following aspects.

In a case where a signal for the UL scheduler control signal extraction part 1709 is included in a MAC header of a MAC_SDU extracted by a MAC_SDU extraction part 1706, the signal for the uplink scheduler is extracted by a MAC header signal reception part 1801. The data (content) of the extracted signal is transferred to the UL scheduler control signal extraction part 1709. The UL scheduler control signal extraction part 1709 combines data of the UL scheduler control signal and data of the MAC header signal as control data from the UL scheduler and applies the combined data to the PHY generation part 1711. Other than the above-described aspect, the functions and operations of the configuration illustrated in FIG. 18 is substantially the same as those of the configuration illustrated in FIG. 17.

Figure 19:
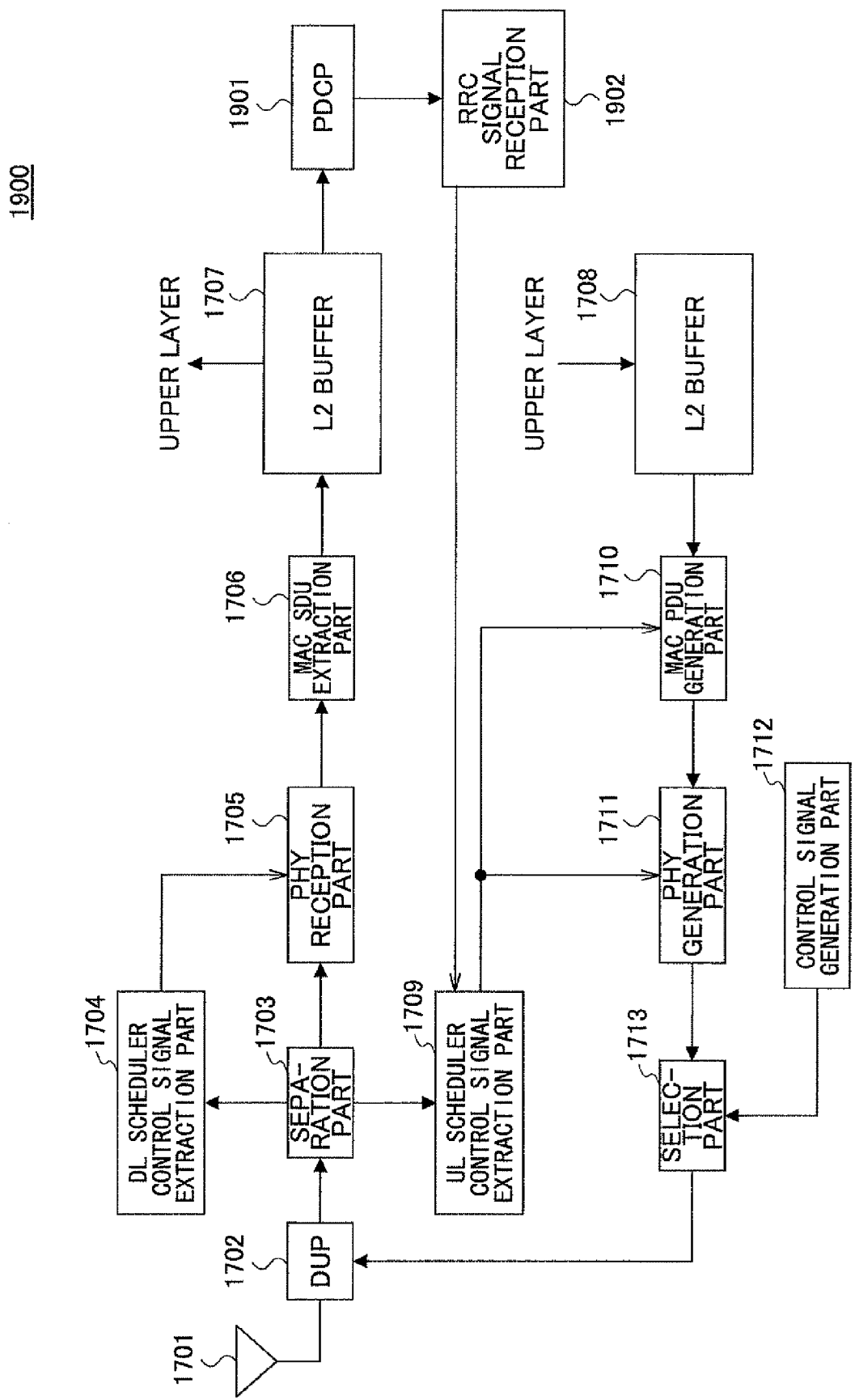
FIG. 19 is a schematic diagram illustrating a configuration of a user equipment according to another embodiment of the present invention.

FIG. 19 is a schematic diagram illustrating a configuration of a user equipment according to an embodiment of the present invention. The user equipment 1900 is used for the third relay method (a case of RRC signaling). The user equipment 1900 is different from the user equipment 1800 in terms of the following aspects.

In this embodiment, instead of performing the processes performed by the user equipment 1800 in a MAC signaling operation, the processes are performed by the user equipment 1900 in a RRC signaling operation. Because signaling is performed in an upper layer, security functionality can be improved by having signals handled through the PDCP layer. In a case where a signal for a scheduler is inserted in an RRC signal, an RRC signal reception part 1902 receives the RRC signal via a PDCP process part 1901. Then, the RRC signal reception part 1902 transfers the data (content) of the RRC signal to the UL scheduler control signal extraction part 1709. The UL scheduler control signal extraction part 1709 combines data of the UL scheduler control signal and data of the RRC signal as control data from the UL scheduler and applies the combined data to the PHY generation part 1711. Other than the above-described aspect, the functions and operations of the configuration illustrated in FIG. 19 is substantially the same as those of the configuration illustrated in FIG. 17.

Figure 20:
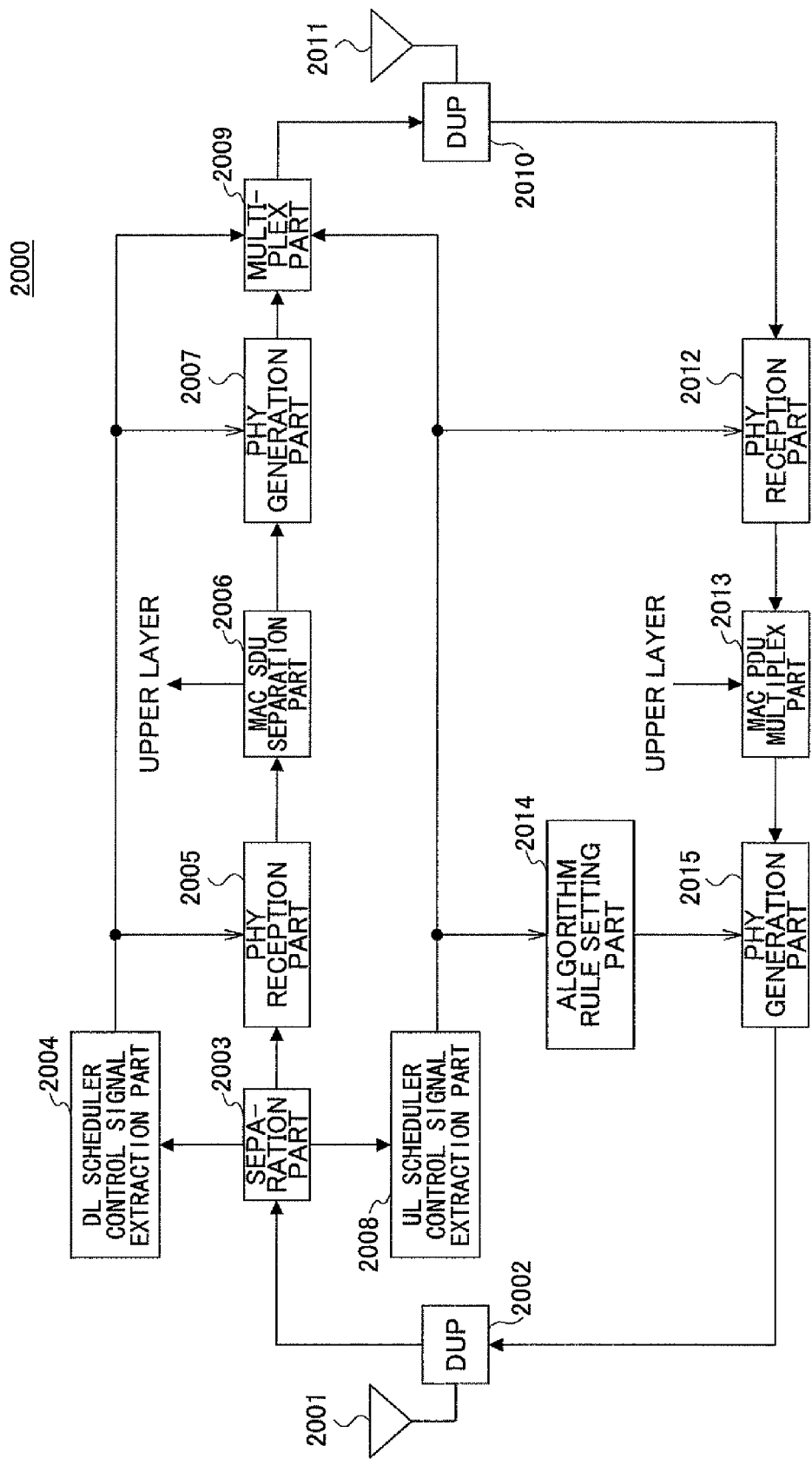
FIG. 20 is a schematic diagram illustrating a configuration of a relay node according to an embodiment of the present invention.

FIG. 20 is a schematic diagram illustrating a configuration of a relay node 2000 according to an embodiment of the present invention. The relay node 2000 is used for the first and second relay methods.

In this embodiment, the relay node 2000 obtains a frequency resource between the relay node (RN) 2000 and the base station (BS) selected from the frequency bands assigned to the user equipments by an UL scheduler based on previous operations by the UL scheduler.

First, an example of an operation performed in the downlink (DL) side of the relay node 2000 is described.

Signals received by an antenna 1701 are transmitted through a duplexer 2002. Then, a DL scheduler control signal(s) is separated from other signals in the received signals by a separation part 2003 and extracted by a DL scheduler control extraction part 2004. In a case where information of the DL scheduler control signal includes information addressed to the relay node 2000 itself, a PHY signal of the received signals is demodulated/decoded by a PHY reception part 2005, and a MAC_SDU is extracted by a MAC_SDU extraction part 2006. The data of the extracted MAC_SDU is stored in a L2 buffer (not illustrated).

In a case of relaying information to the user equipment via the relay node 2000 itself, the relay node 2000 demodulates/decodes the PHY signal with the PHY reception part 2005 based on the DL scheduler control signal. Then, the PHY signal is separated from the MAC_SDU by the MAC_SDU extraction part 2006. Then, the separated PHY signal is coded/modulated by the PHY generation part 2007 and relayed to the user equipment UE.

The PHY signal generated by the PHY generation part 2007 is multiplexed with control signals from the DL scheduler signal extraction part 2004 and control signals from a UL scheduler control signal extraction part 2008 by a multiplex part 2009. Then, the multiplexed signals are transmitted from an antenna 2011 via a duplexer 2010.

In a case of relaying in the downlink (DL) side of the relay node 2000, UL signals, for example, may be relayed without being decoded. In this case, only UL signals to be relayed are extracted by a digital filter and relayed.

Next, an example of a relay transmission operation in the uplink side (UL) of the relay node 2000 is described.

Signals received from a user equipment (UE) by the antenna 2011 are transmitted through the duplexer 2010. Then, a UL scheduler control signal(s) is separated from other signals in the received signals by the separation part 2003 and extracted by a UL scheduler control extraction part 2008. Then, a PHY signal of the UE for relay is demodulated/decoded based on the UL scheduler control signal. Then, the signals received from the UE are multiplexed with a MAC_PDU generated from a MAC_PDU multiplex part 2013. Further, in a case where there is a signal of an upper layer to be relayed from the relay node 2000 to the base station, the signal is also multiplexed with the other received signals.

Then, an algorithm rule setting part 2014 obtains an algorithm rule for the generated MAC_PDU based on UL scheduler control signals from the UL scheduler control signal extraction part 2008. Further, the PHY generation part 2015 generates a PHY signal for the signals to be relayed and encodes/modulates the PHY signal.

The generated PHY signal is transmitted to a base station (not illustrated) from the antenna 2001 via the duplexer 2002.

Figure 21:
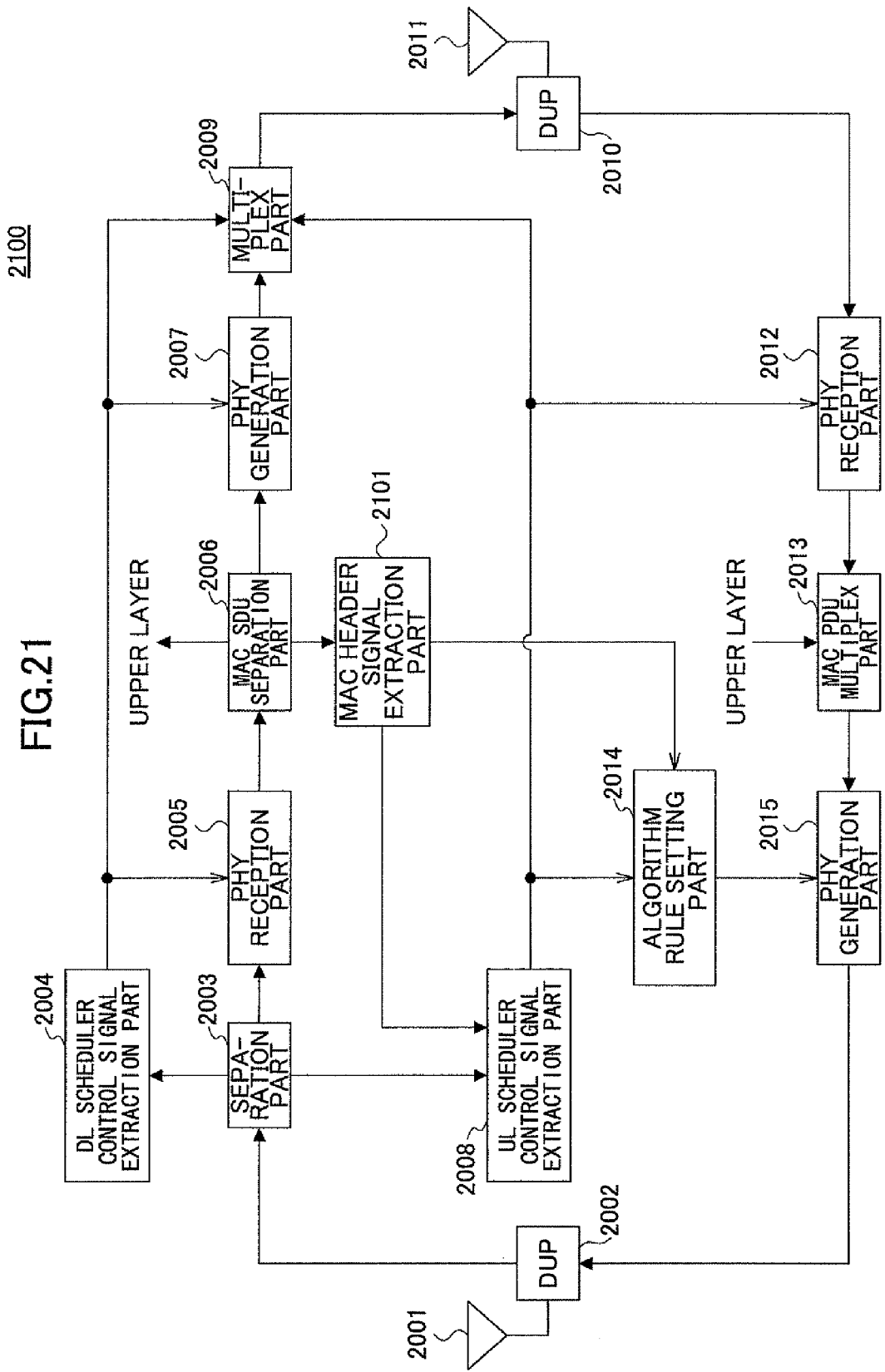
FIG. 21 is a schematic diagram illustrating a configuration of a relay node according to an embodiment of the present invention.

FIG. 21 is a schematic diagram illustrating a configuration of a relay node 2100 according to an embodiment of the present invention. The relay node 2100 is used for the third relay method (a case of MAC signaling). The relay node 2100 is different from the relay node 2000 in terms of the following aspects.

In this embodiment, a MAC signal is inserted in a DL signal from the base station. The configuration of the DL side differs depending on the method of extracting the MAC signal.

In a case where the MAC signal is attached to the signals from each user equipment, the signals from each UE are decoded based on a DL scheduler control signal. Then, a MAC header signal extraction part 2101 determines whether a MAC signal is attached to the signals from the UE. In a case where a MAC signal is attached to the signals from the UE, the MAC header signal extraction part 2101 extracts the MAC signal.

On the other hand, in a case where a MAC signal is also attached to a MAC_PDU for the relay node, the MAC_PDU for the relay node is decoded. Then, the MAC header signal extraction part 2101 determines whether a MAC signal is attached to the MAC_PDU for the relay node. In a case where a MAC signal is attached to the MAC_PDU for the relay node, the MAC header signal extraction part 2101 extracts the MAC signal.

The extracted MAC signal is reported to an algorithm rule setting part 2014 together with a UL scheduler control signal from a UL scheduler control signal extraction part 2008. Other than the above-described aspect, the functions and operations of the configuration illustrated in FIG. 21 is substantially the same as those of the configuration illustrated in FIG. 20.

Figure 22:
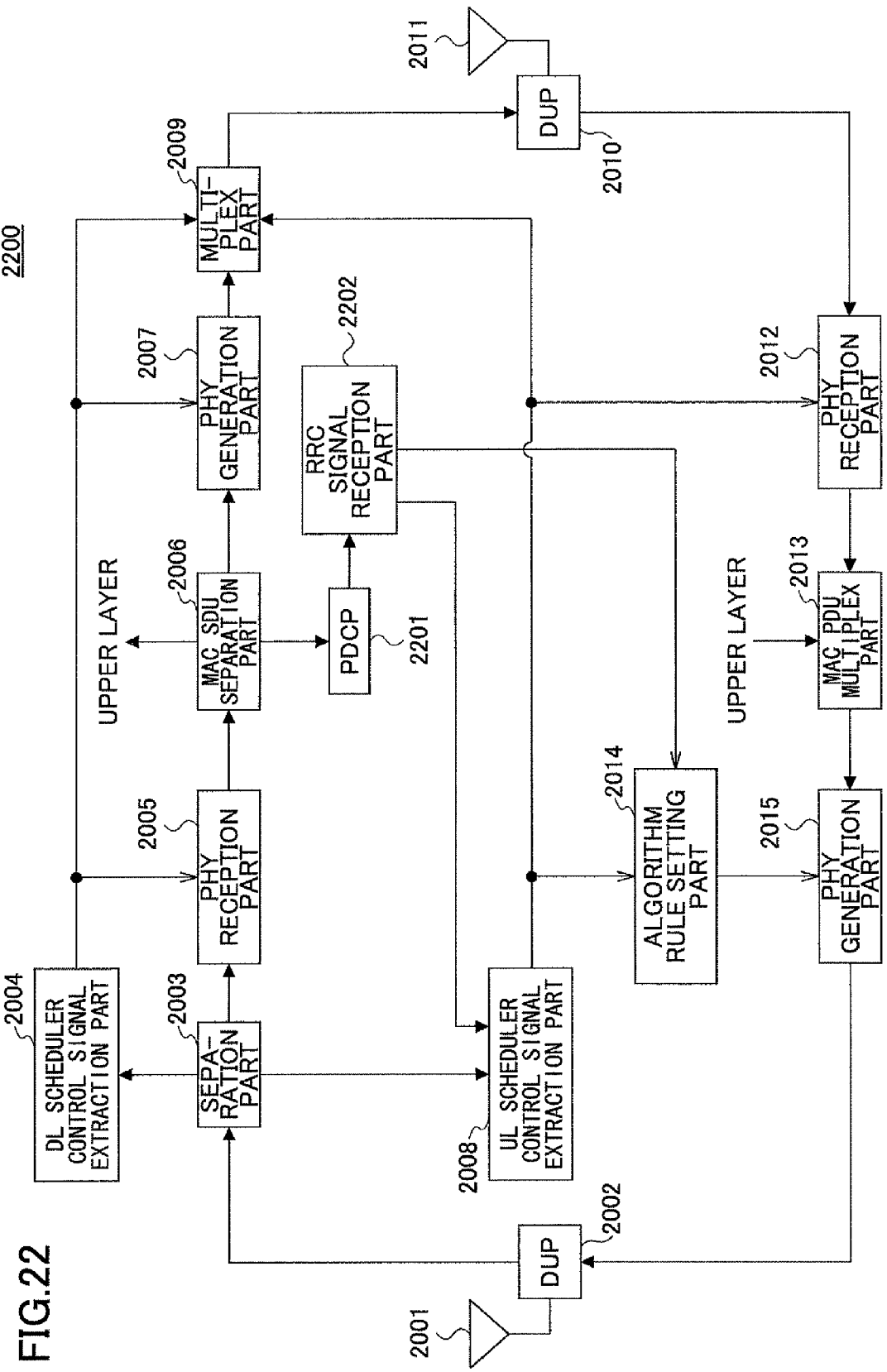
FIG. 22 is a schematic diagram illustrating a configuration of a relay node according to an embodiment of the present invention.

FIG. 22 is a schematic diagram illustrating a configuration of a relay node 2200 according to an embodiment of the present invention. The relay node 2200 is used for the third relay method (a case of RRC signaling). The relay node 2200 is different from the relay node 2100 in terms of the following aspects.

In this embodiment, instead of performing the processes performed by the relay node 2100 of FIG. 21 in a MAC signaling operation, the processes are performed by the relay node 2200 in a RRC signaling operation. Because signaling is performed in an upper layer, security functionality can be attained by having signals handled through the PDCP layer.

In the downlink side, when a signal for a relay node is included in a received signal(s) according to a DL scheduler control signal, the PHY signal is demodulated/decoded by the PHY reception part 2005. Then, a MAC_SDU is separated from the received signals by the MAC_SDU separation part 2006. Then, a PDCP process part 2201 performs a PDCP process on the MAC_SDU. In a case where an RRC signal pertaining to an UL schedule is included, an RRC signal reception part 2202 receives the RRC signal and reports the RRC signal to an algorithm rule setting part 2014.

With the configuration of FIG. 22, the signals of each UE to be relayed may be decoded before being relayed. Alternatively, UL signals may be relayed without being decoded. In the case of not decoding the UL signals, only the UL signals are extracted by a digital filter (not illustrated) and relayed.

Next, examples of a configuration of a relay node according to an embodiment of the present invention are described in further detail.

Figure 23:
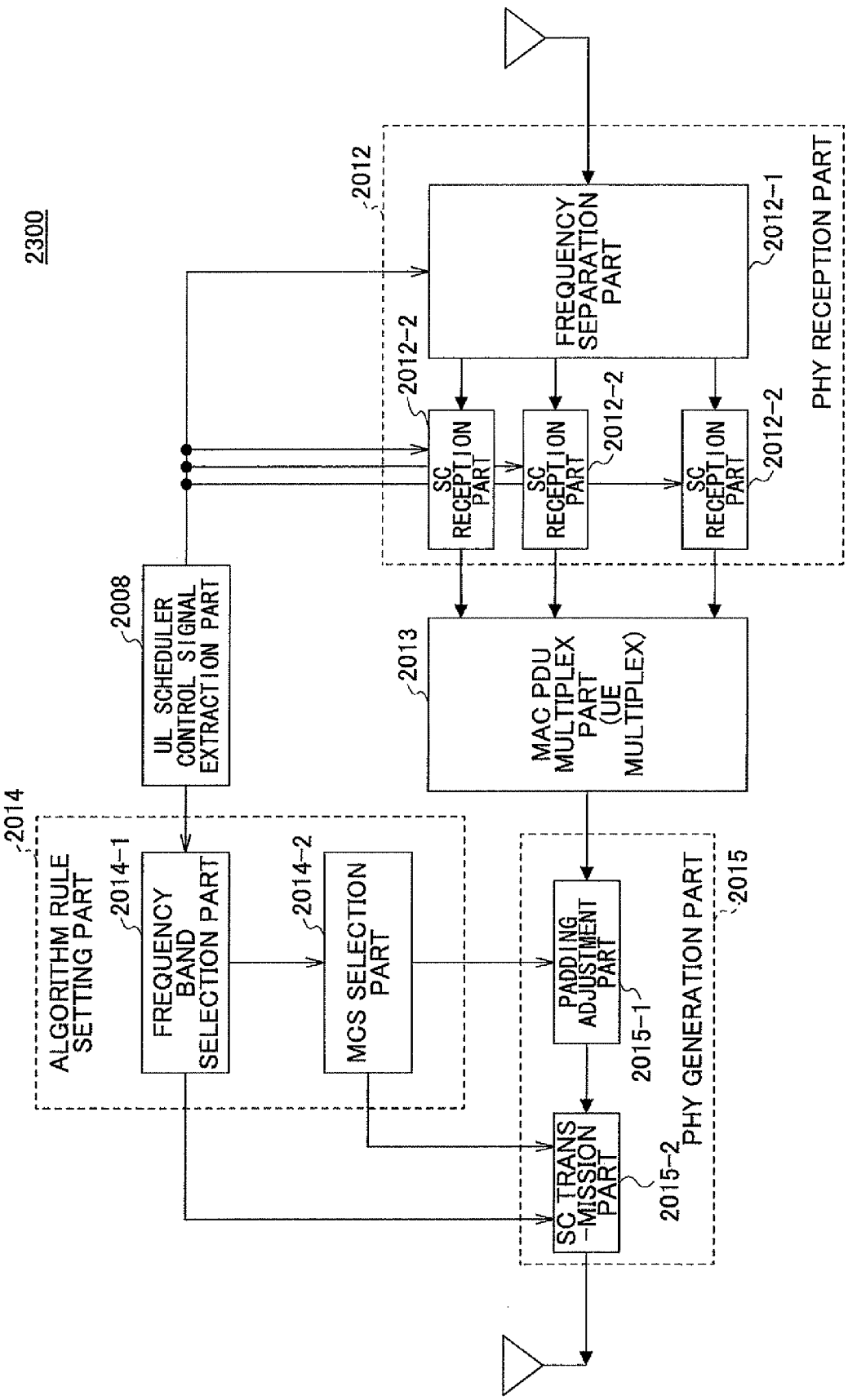
FIG. 23 is a schematic diagram for describing an example of a configuration of a relay node in further detail.

FIG. 23 is a schematic diagram for describing an example of a configuration of a relay node 2300 in further detail. The relay node 2300 of FIG. 23 is used for the first relay method illustrated in FIGS. 3A-3C. FIG. 23 illustrates a PHY reception part 2012 of the UL side of the relay node 2300, an internal configuration of the PHY reception part 2012, a MAC_PDU multiplex part 2013, a PHY generation part 2015, an internal configuration of the PHY generation part 2015, a UL scheduler control signal extraction part 2008, an algorithm rule setting part 2014, and an inner configuration of the algorithm rule setting part 2014 according to an embodiment of the present invention.

Information pertaining to the units of a PHY signal and information for demodulating/decoding a PHY signal are reported to the PHY reception part 2012 by control signals sent from the UL scheduler control signal extraction part 2008. Based on the reported information, a frequency separation part 2012-1 of the PHY reception part 2012 separates the frequency range in correspondence with each user equipment UE, and a SC (Single Carrier) reception part 2012-2 performs SC reception with respect to a corresponding PHY signal (or a corresponding frequency range). Each of the MAC layer signals received by the SC reception part 2012 are combined into one by a MAC_PDU multiplex part 2013 and then sent to a PHY generation part 2015.

A frequency band selection part 2014-1 of the algorithm rule setting part 2014 selects a frequency band based on information of a UL scheduler control signal from the UL scheduler signal extraction part 2008. Then, a MCS selection part 2014-2 performs MCS selection.

It is to be noted that an example of an operation of a frequency band selection part 2014-1 is described below in further detail with reference to FIGS. 31 and 32. Further, the MCS selection part 2014-2 is described below in further detail with reference to FIG. 39.

Because the amount of padding data is reported to the PHY generation part 2015, a padding adjustment part 2015-1 of the PHY generation part 2015 adds padding to the combined PHY signal. Further, a SC transmission part 2015-2 generates a single carrier signal based on a format reported from the frequency band selection part 2014-1 and the MCS selection part 2014-2 and relays the single carrier signal from the antenna 2001.

Figure 24:
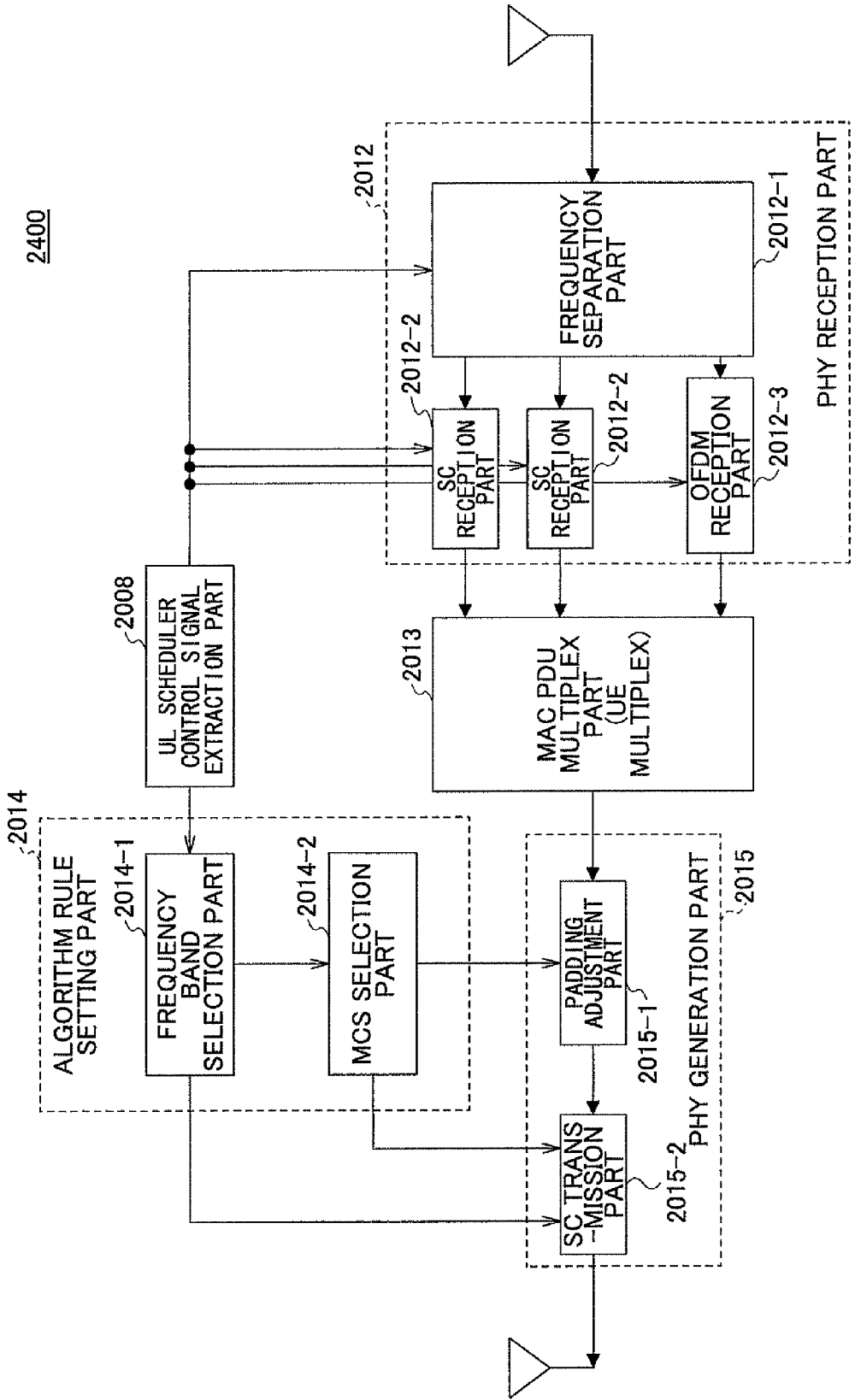
FIG. 24 is a schematic diagram illustrating a modified example of a configuration of a relay node according to an embodiment of the present invention.

FIG. 24 is a schematic diagram illustrating a modified example of a configuration of a relay node 2400 according to an embodiment of the present invention. The relay node 2400 uses the modified example of the second relay method. Compared to the relay node 2300 of FIG. 23, the PHY reception part 2012 of the relay node 2400 not only includes the SC reception parts 2012-2 for receiving single carrier signals from the user equipments but also includes an OFDM reception part 2012-3 for receiving OFDM signals. Other than the above-described difference, the configuration of the relay node 2300 and the configuration of the relay node 2400 are substantially the same.

Figure 25:
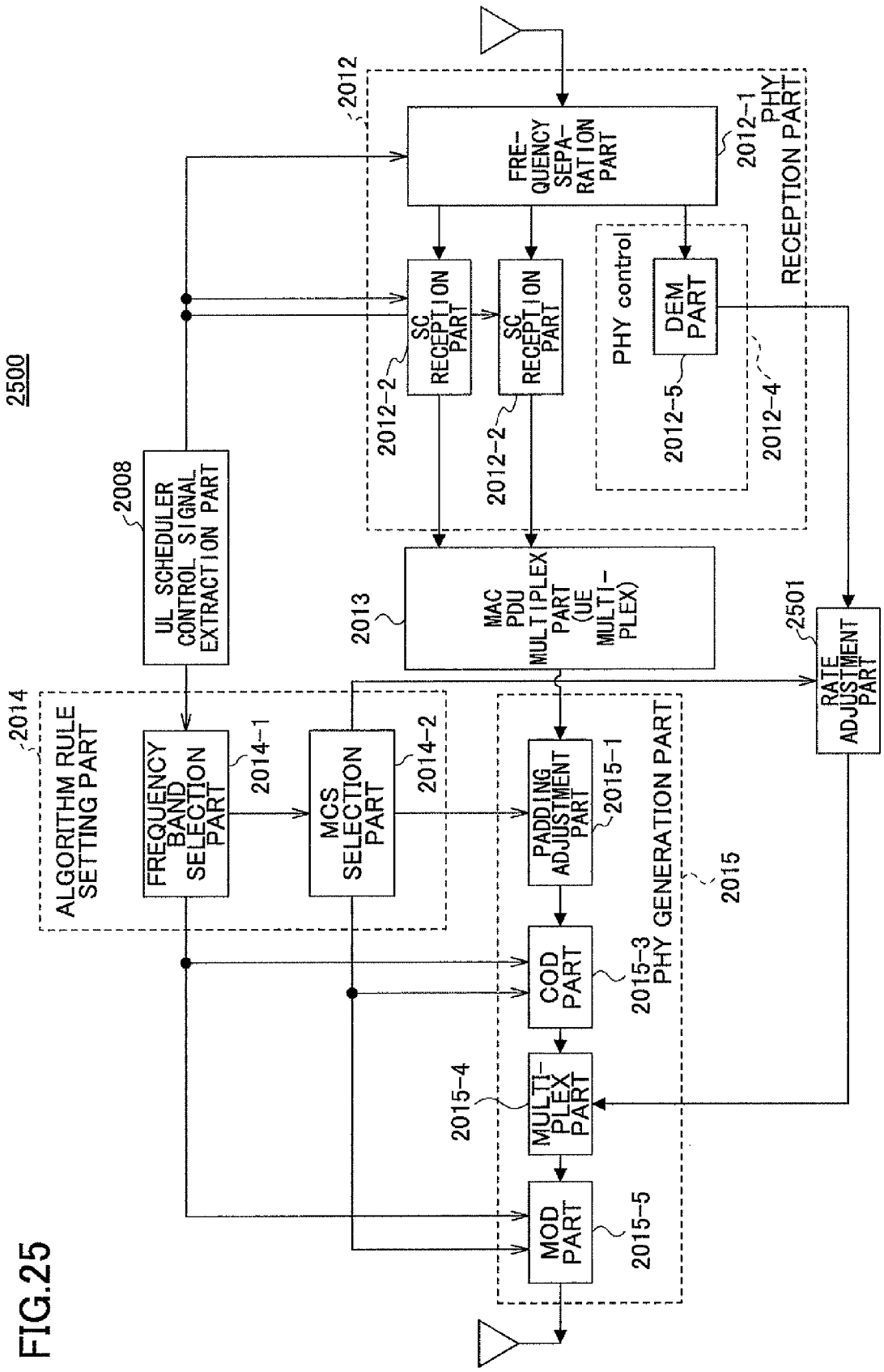
FIG. 25 is a schematic diagram for describing another example of a configuration of a relay node in further detail.

FIG. 25 is a schematic diagram for describing another example of a configuration of a relay node 2500 in further detail. The relay node 2500 also performs single carrier relay by mapping a physical control signal (control signal of the physical layer) to a single PHY signal. The relay node 2500 is used for performing the multiplexing method described above with reference to FIGS. 9A-9D.

In the frequency separation part 2012-1, signals are separated into respective PHY signals. Then, a PHY control signal reception part 2012-4 extracts a physical control channel signal(s) from the PHY signals. Then, a demodulation part 2012-5 performs demodulation on the extracted physical control channel signal.

Then, a rate adjustment part (rate control part) 2501 performs rate adjustment on the signals output from the demodulation part 2012-5 in correspondence with a band that can be used after relay.

Then, in the PHY generation part 2015, a padding adjustment part 2015-1 performs padding adjustment on UE multiplexed signals. Then, the padding adjusted signals are coded by a coding part 2015-3. Then, a multiplex part 2015 multiplexes the coded signals with rate adjusted signals from a rate adjustment part 2501.

The modulation part 2015-5 applies substantially the same modulation to the multiplexed signals as the modulation applied to the shared channel signals. Then, the modulated signals are relayed from an antenna of the relay node 2500.

Accordingly, in this embodiment, a multiplex process is performed on the physical control channel immediately before modulation. The relay method used in this embodiment is described below in further detail with reference to FIG. 35.

Further, the frequency band selection part 2014-1 of the algorithm rule setting part 2014 may select an algorithm of FIG. 34 in addition to an algorithm described below with reference to FIGS. 31 and 32. An MCS selection part 2014-2 corresponds to an algorithm described below with reference to FIG. 39.

Figure 26:
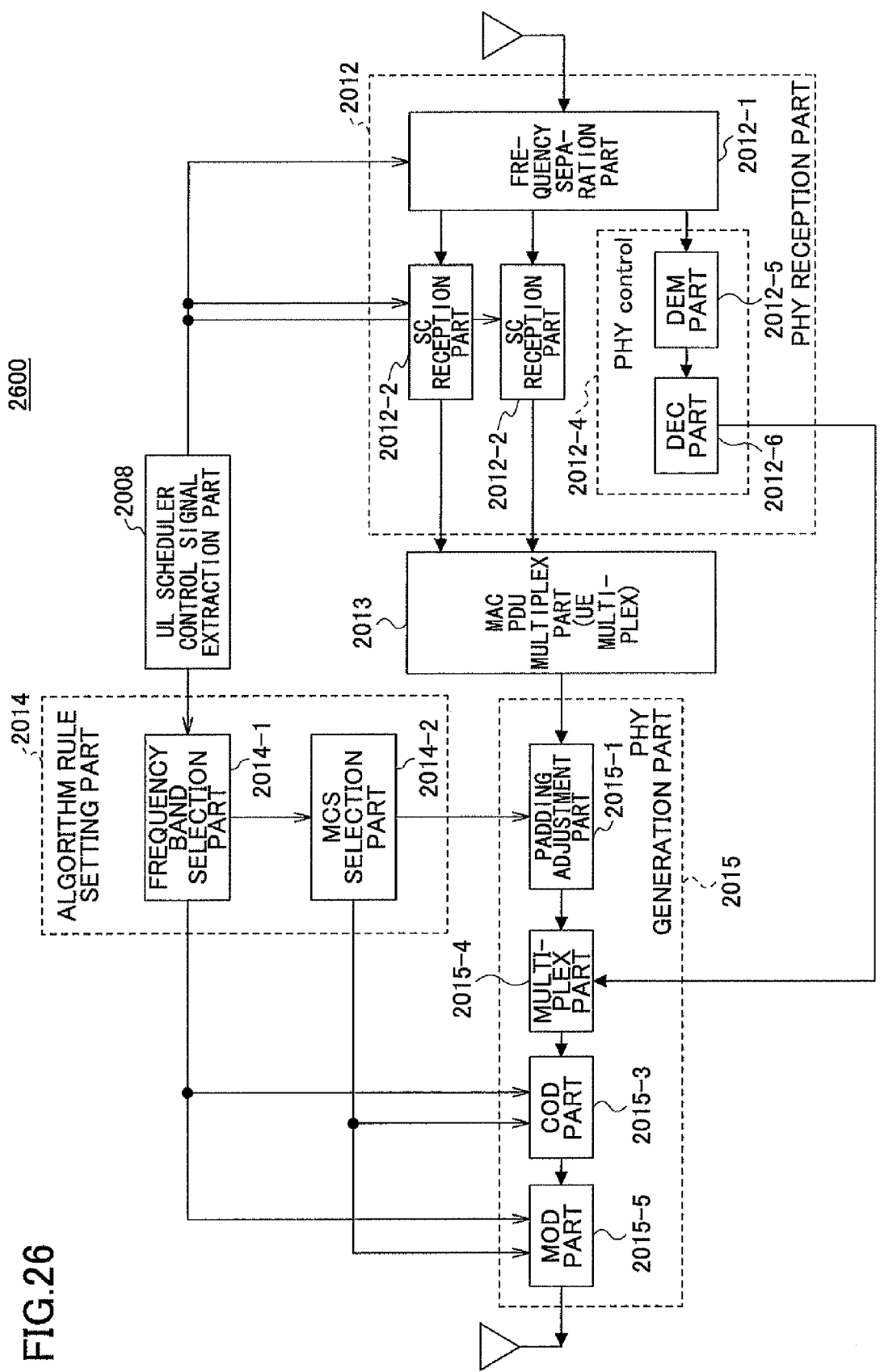
FIG. 26 is a schematic diagram illustrating a modified example of a relay node according to an embodiment of the present invention.

FIG. 26 is a schematic diagram illustrating a modified example of a relay node 2600 according to an embodiment of the present invention. Compared to the relay node 2500 of FIG. 25, the relay node 2600 uses a different method for mapping the physical control channel signal. The relay node 2600 is used for the relay method described above with reference to FIGS. 10A-10C.

In the relay node 2600, the demodulation part 2012-6 of the PHY control signal reception part 2012-4 demodulates physical control channel signals. Then, if possible, the demodulated physical control channel signals are decoded by the decoding part 2012-6.

The signals (information) decoded by the decoding part 2012-6 are multiplexed with padding adjusted signals from the padding adjustment part 2015-1 in the multiplex part 2015-4 of the PHY generation part 2015. Then, the coding part 2015-3 performs substantially the same coding process on the multiplexed signals as the coding performed on the shared channel signals. Then, the modulation part 2015-5 performs modulation on the coded signals. Then, the modulated signals are relayed from an antenna of the relay node 2600.

The mapping method used in this embodiment corresponds to the method described below with reference to FIG. 36.

In the frequency band selection part 2014-1 of the algorithm rule setting part 2014 may select an algorithm of FIG. 34 in addition to an algorithm described below with reference to FIGS. 31 and 32. The MCS selection part 2014-2 corresponds to an algorithm described below with reference to FIG. 39.

Figure 27:
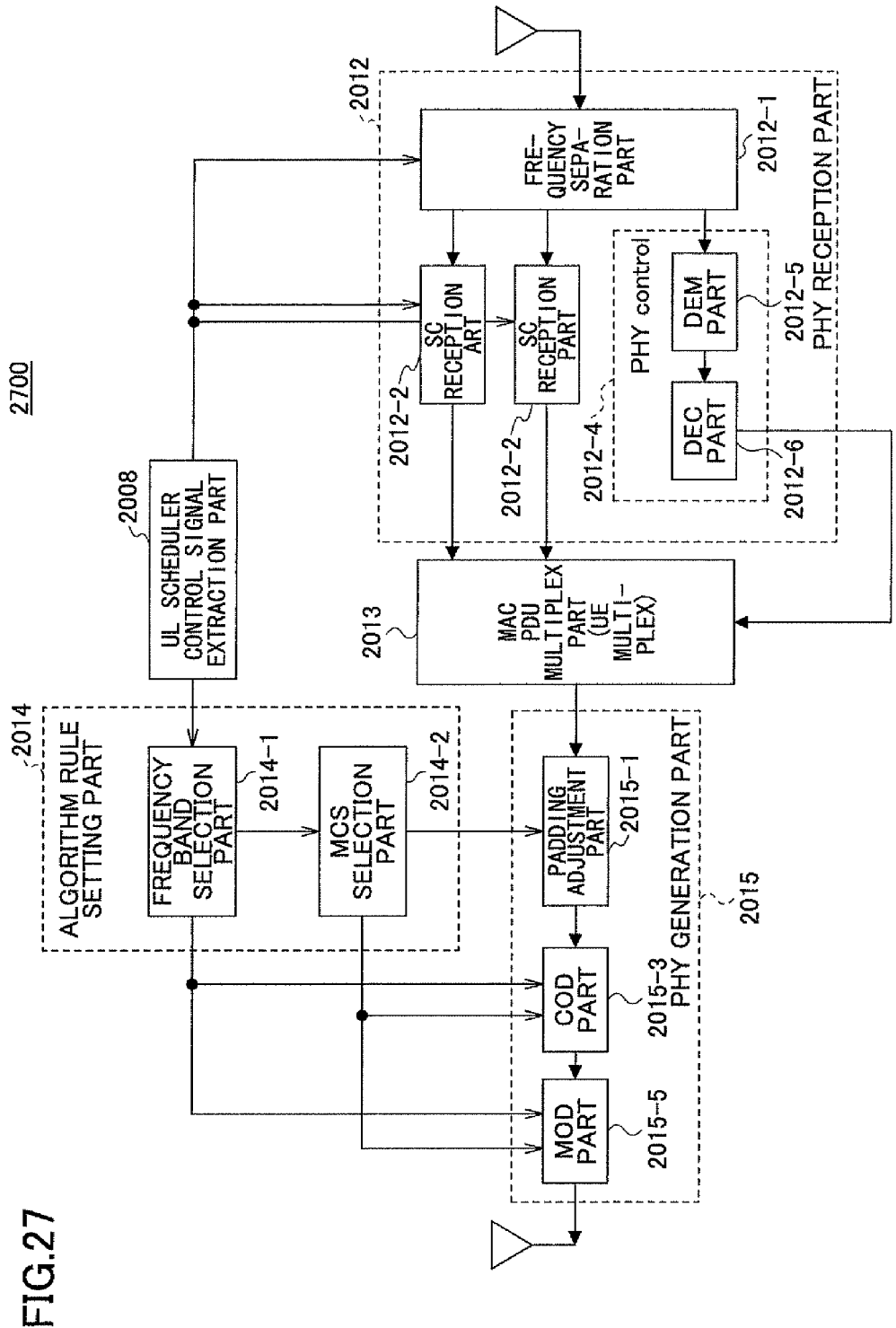
FIG. 27 is a schematic diagram illustrating a modified example of a relay node according to an embodiment of the present invention.

FIG. 27 is a schematic diagram illustrating a modified example of a relay node 2700. Compared to the relay node 2500 of FIG. 25, the relay node 27 uses a different method of mapping physical control channel signals. The relay node 2700 is used for the relay method described above with reference to FIGS. 11A-11C and FIGS. 12A-12C.

In the PHY control signal reception part 2012-4, a demodulation part 2012-6 demodulates signals of the physical control channel (physical control channel signals). Then, the decoding part 2012-6, if possible, decodes the demodulated signals.

Then, the signals decoded by the decoding part 2012-6 are multiplexed with signals of the MAC_PDU by the MAC_PDU multiplex part 2013. Then, a PHY generation part 2015 performs the same process perform substantially the same PHY signal transmission process on the multiplexed MAC_PDU signals as the transmission process performed on the shared channel signals. Then, the PHY signals are transmitted from an antenna of the relay node 2700. Because the physical control channel signals are multiplexed by the MAC_PDU multiplex part 2013, no multiplex part is provided in the PHY generation part 2015.

The MAC_PDU multiplex part 2013 may be a type that attaches the physical control channel signals to the signals of the shared channel as extra bits at the MAC layer as described below with reference to FIG. 37 or a type that uses a MAC header in attaching the physical control channel signals to the signals of the shared channel as described below with reference to FIG. 38.

The frequency band selection part 2014-1 of the algorithm rule setting part 2014 may select an algorithm of FIG. 34 in addition to an algorithm described below with reference to FIGS. 31 and 32. An MCS selection part 2014-2 corresponds to an algorithm described below with reference to FIG. 39.

Next, examples of a configuration of a base station according to an embodiment of the present invention are described in further detail.

Figure 28:
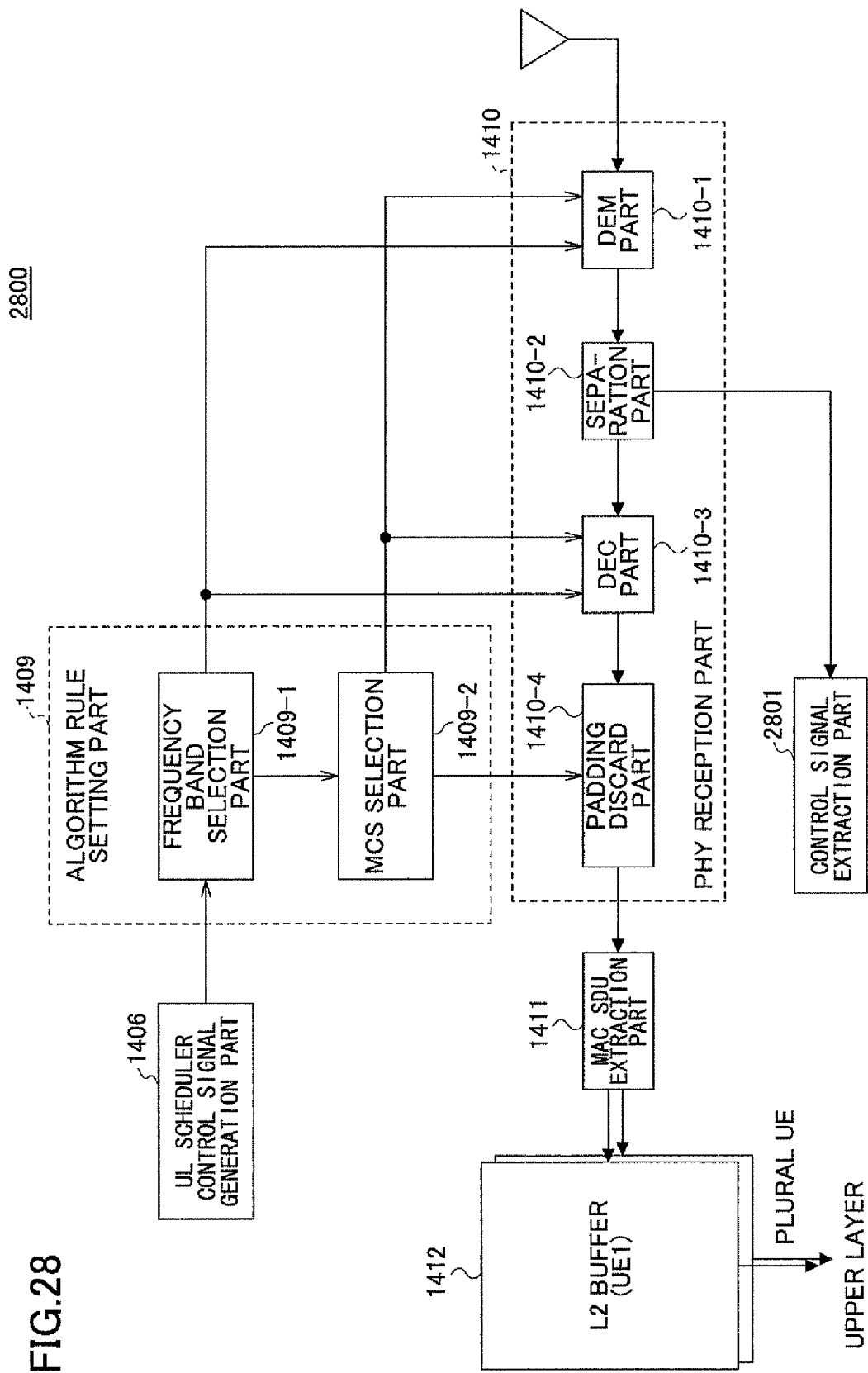
FIG. 28 is a schematic diagram for describing an example of a configuration of a base station in further detail.

FIG. 28 is a schematic diagram for describing an example of a configuration of a base station 2800 in further detail.

FIG. 28 illustrates the PHY reception part 1410 of the UL side of the base station 2800, an internal configuration of the PHY reception part 1410, the algorithm rule setting part 1409, and an inner configuration of the algorithm rule setting part 1409 according to an embodiment of the present invention.

In the algorithm rule setting part 1409, a frequency band selection part 1409-1 selects a frequency band based on information of an UL scheduler control signal 1406, and a MCS selection part 1409-2 selects an MCS to be used.

The frequency selection part 1409-1 may select an algorithm of FIG. 34 in addition to an algorithm described below with reference to FIGS. 31 and 32. The algorithm is to be determined beforehand so that the algorithm used by the base station matches the algorithm used by the relay node.

Figure 39:
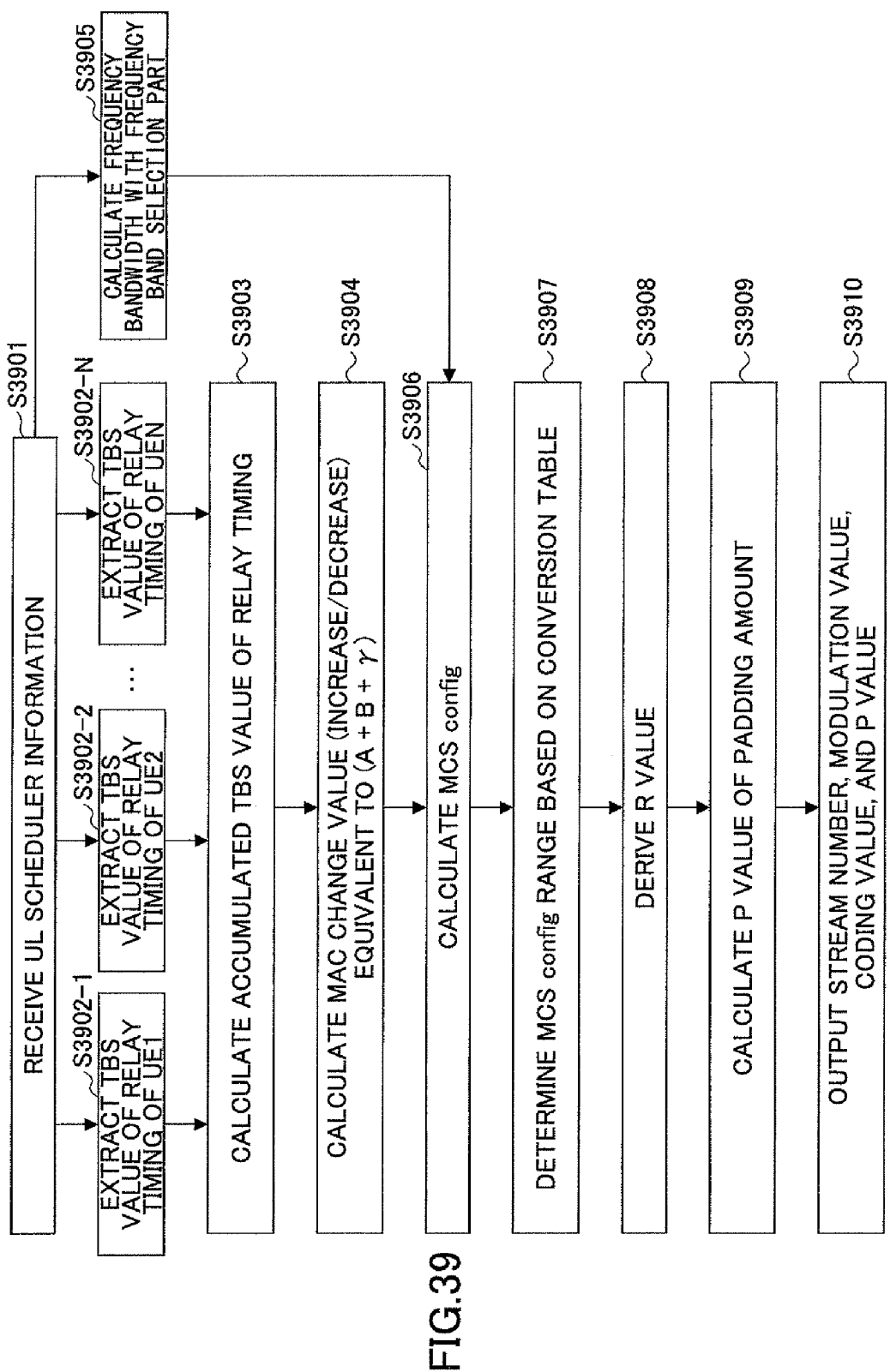
FIG. 39 is a flowchart illustrating an example of MCS adjustment according to an embodiment of the present invention.

The MCS selection part 1409-2 operates according to, for example, an algorithm described below with reference to FIG. 39.

In the PHY reception part 1410, the demodulation part 1409-1 and the MCS selection part 1409-2 demodulates and decodes single carrier signals based on a format notified from the frequency band selection part 1409-1 and the MCS selection part 1409-2. Data of the decoded signals are stored in correspondence with each UE inside the L2 buffer 1412 via the MAC_SDU extraction part 1411.

The control signals of the physical layer are separated from the other single carrier signals by the separation part 1410-2 after modulation and extracted from the control signal extraction part 2801.

A padding discard part 1410-4 discards padding data based on padding insertion information (information pertaining to the inserting of padding data) reported from the MCS selection part 1409-2.

The base station 2800 is to be used in pairs with the relay node 2500 of FIG. 25.

Figure 29:
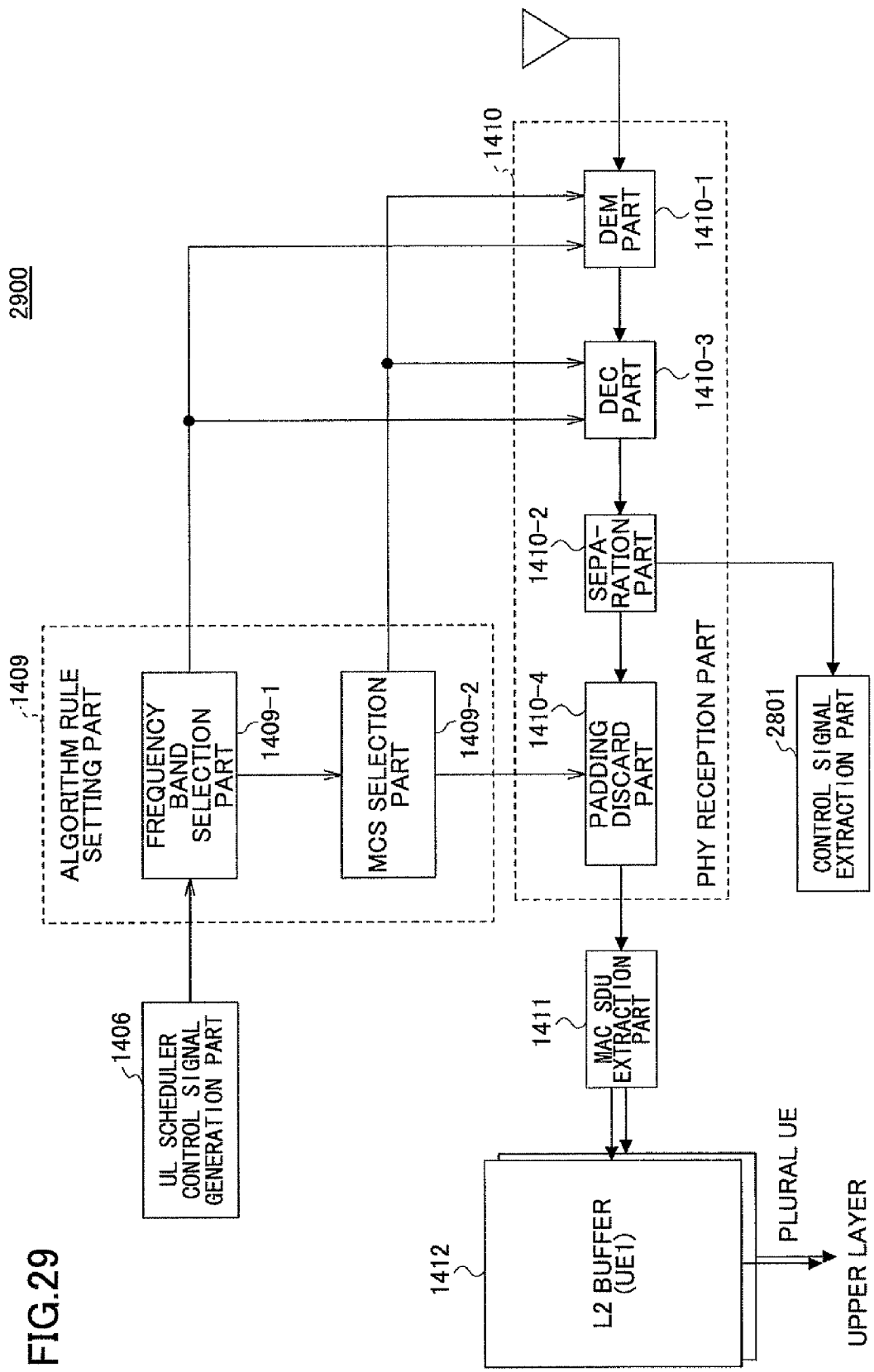
FIG. 29 is a schematic diagram for describing another example of a configuration of a base station in further detail.

FIG. 29 is a schematic diagram for describing another example of a configuration of a base station 2900 in further detail. The base station 2900 is used for the relay method described above with reference to FIGS. 10A-10C.

The base station 2900 is to be used in pairs with the relay node 2600 of FIG. 26. After single carrier signals are modulate and decoded by the demodulation part 1410-1 and the decoding part 1410-3, the control signals of the physical layer are separated from the other signals by the separation part 1410-2 and extracted by the control signal extraction part 2801.

Figure 30:
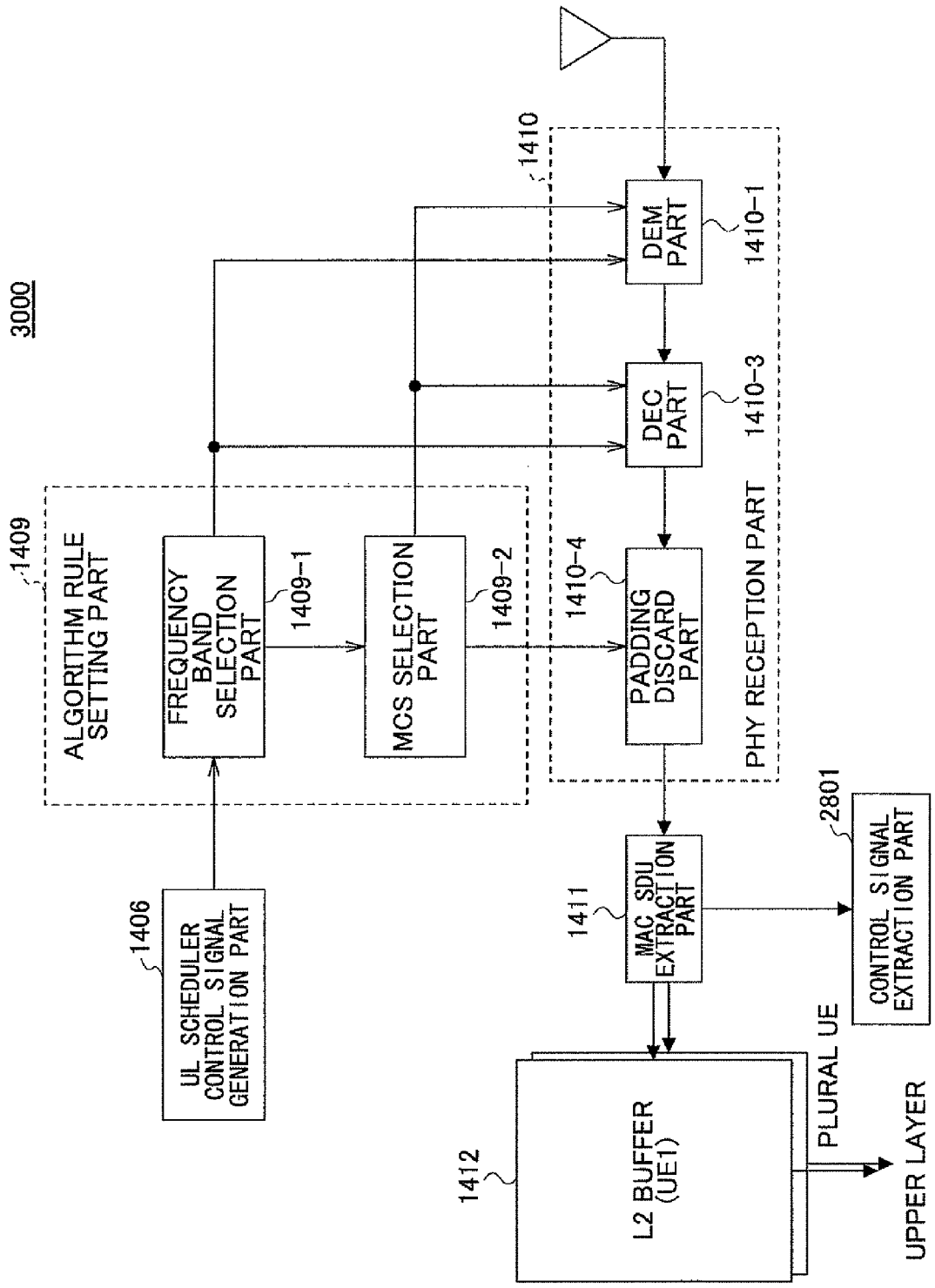
FIG. 30 is a schematic diagram for describing another example of a configuration of a base station in further detail.

FIG. 30 is a schematic diagram for describing another example of a configuration of a base station 3000 in further detail. The base station 3000 is used for the relay method described above with reference to FIGS. 11A-11C and FIGS. 12A-12C.

The base station 3000 is to be used in pairs with the relay node 2700 of FIG. 27. In the process of extracting MAC-SDU signals with the MAC_SDU extraction part 1411, the control signals of the physical layer are separated and extracted.

The MAC_SDU extraction part 1411 may be a type that recognizes the last remaining data as data containing physical control data as described above with reference to FIGS. 11A-11C or a type that refers to a MAC header as described above with reference to FIGS. 12A-12C.

Next, examples of a relay method according to an embodiment of the present invention are described in further detail with reference to the flowcharts illustrated in FIGS. 31-40.

Figure 31:
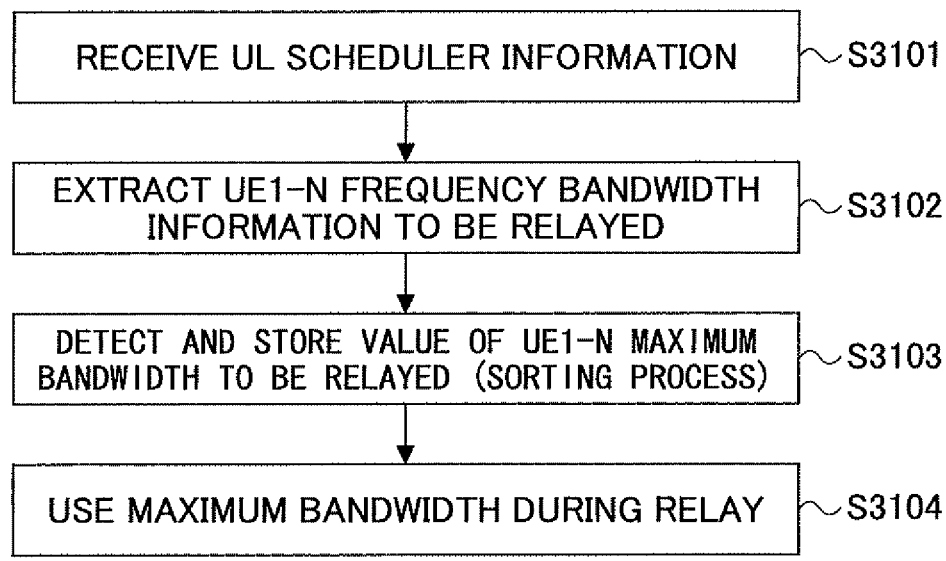
FIG. 31 is a flowchart illustrating an example of a relay method according to an embodiment of the present invention.

FIG. 31 is a flowchart illustrating an example of the relay method described above with FIGS. 3A-3C. This relay method may be performed with, for example, the relay node 2000 of FIG. 20.

In step S3101, the relay node receives signals indicating UL scheduler information. Then, in Step S3102, the relay node extracts frequency band information of the user equipments (UE1-UEn) to be used for relay (transmission). This step may be performed by, for example, the UL scheduler control information extraction part 2008 of FIG. 20.

Then, the relay node detects the maximum value of the frequency bandwidths of the UE1-UEn, stores (retains) the detected maximum value, and sorts the stored values (Step S3104). Then, the maximum bandwidth is used during relay (Step S3105). This step may be performed by, for example, the algorithm rule setting part 2014 and the PHY generation part 2015 of FIG. 20.

Figure 32:
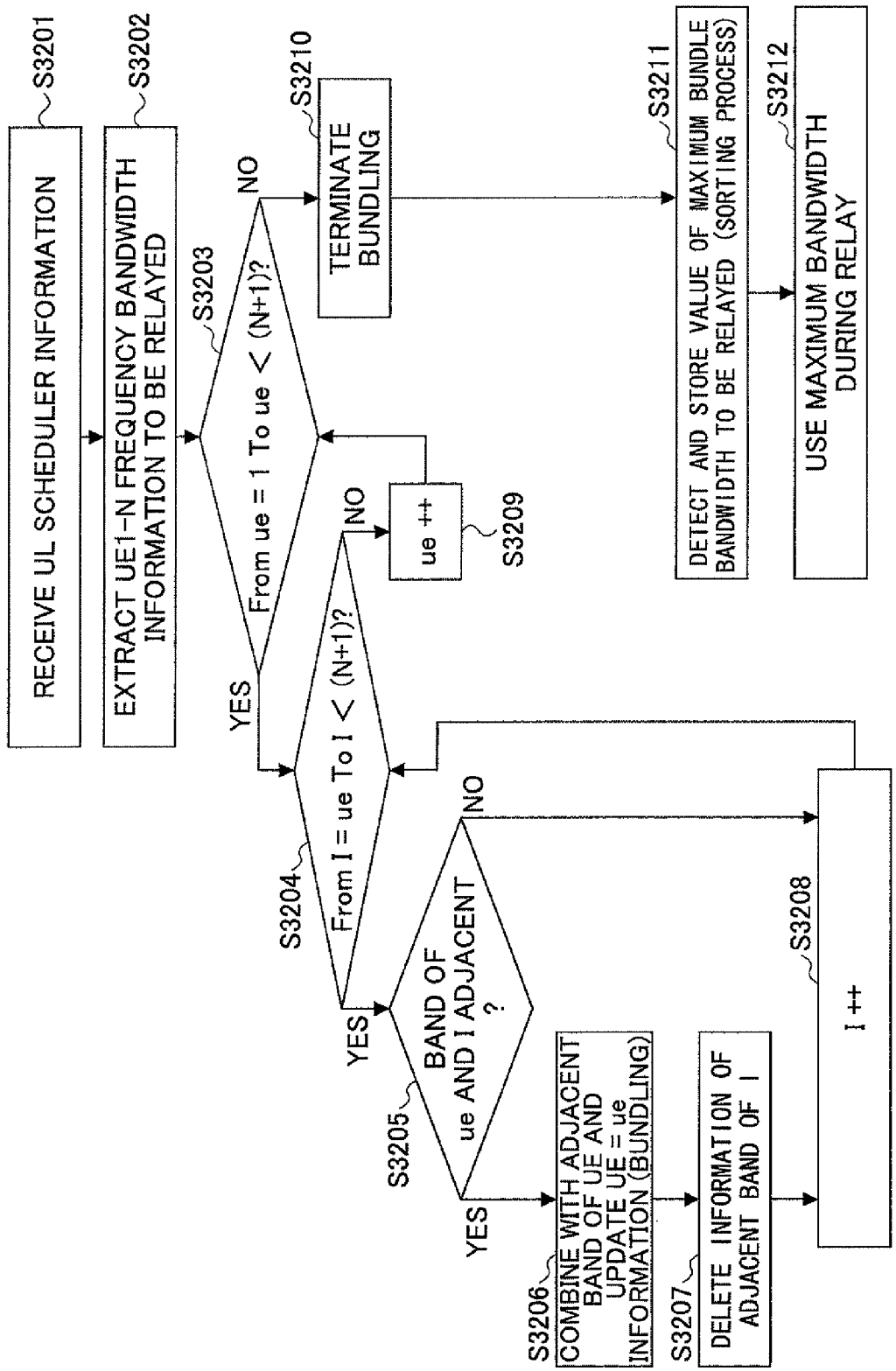
FIG. 32 is a flowchart illustrating another example of a relay method according to an embodiment of the present invention.

FIG. 32 is a flowchart illustrating an example of the relay method described above with FIGS. 4A-4C. This relay method may be performed by, for example, the relay node 2000 of FIG. 20.

In step S3201, the relay node receives signals indicating UL scheduler information. Then, in Step S3202, the relay node extracts frequency band information of the user equipments (UE1-UEn) to be used for relay (transmission). This step may be performed by, for example, the UL scheduler control information extraction part 2008 of FIG. 20.

Then, in Steps 3203-S3209, adjacent bands of UE1-UEn are bundled (combined). More specifically, a parameter ue (ue=1 to N, Step S3203) and a parameter I (I=ue to N, Step S3204) in the bundling process. In a case where the band of a user equipment of a ue order and a band of another user equipment of an I order are adjacent (Yes in Step S3205), bundling is performed by combining the adjacent bands of the UE, updating information of the ue order (Step S3206), and deleting information of the user equipment of the I$^{th}$ order (S3207).

After bundling all of the frequency bands of the UE1-UEN (Step S3210), a maximum bandwidth of the bundled frequency bands is detected, stored, and sorted (Step S3211). Then, the bundled frequency band having the maximum value is used for relay (Step S3212). These steps may be performed by, for example, the algorithm rule setting part 2014 and the PHY generation part 2015.

Figure 33:
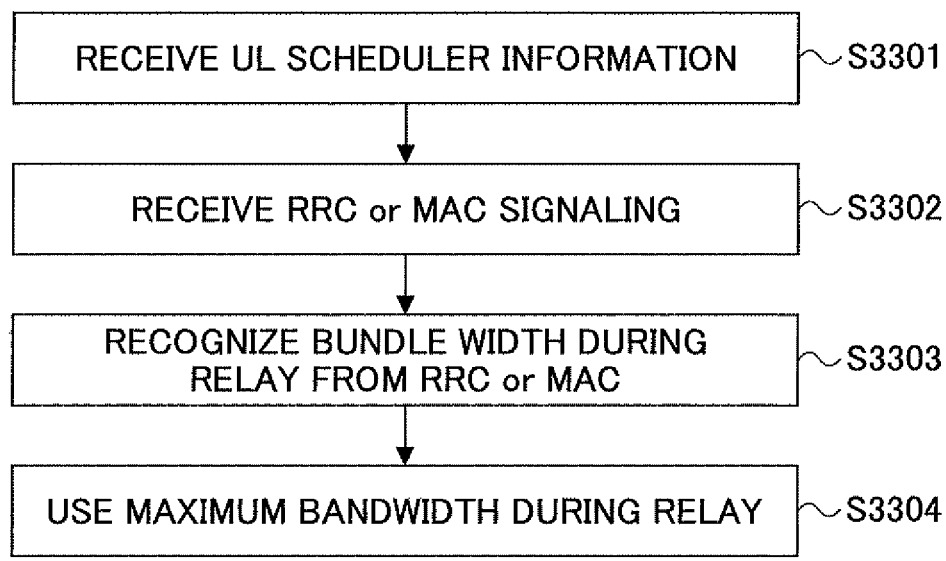
FIG. 33 is a flowchart illustrating another example of a relay method according to an embodiment of the present invention.

FIG. 33 is a flowchart illustrating an example of the relay method described above with FIGS. 7A-7C. This relay method may be performed by, for example, the relay node 2100 of FIG. 21.

In step S3301, the relay node receives signals indicating UL scheduler information. Then, in Step S3302, the relay node receives RRC signals or MAC signals (RRC signaling or MAC signaling). The base station performs scheduling so that the frequency bands used by the user equipments become adjacent to each other. In the case of RRC signaling, the frequency bands are set beforehand. In the case of MAC signaling, the frequency bands are set when assigning resources to the user equipments.

The relay node recognizes the bandwidth of the bundled frequency band used during relay based on the RRC signals or the MAC signals (Step S3303). Then, the relay node performs relay by using the bundled frequency having the recognized bandwidth (Step S3304).

Figure 34:
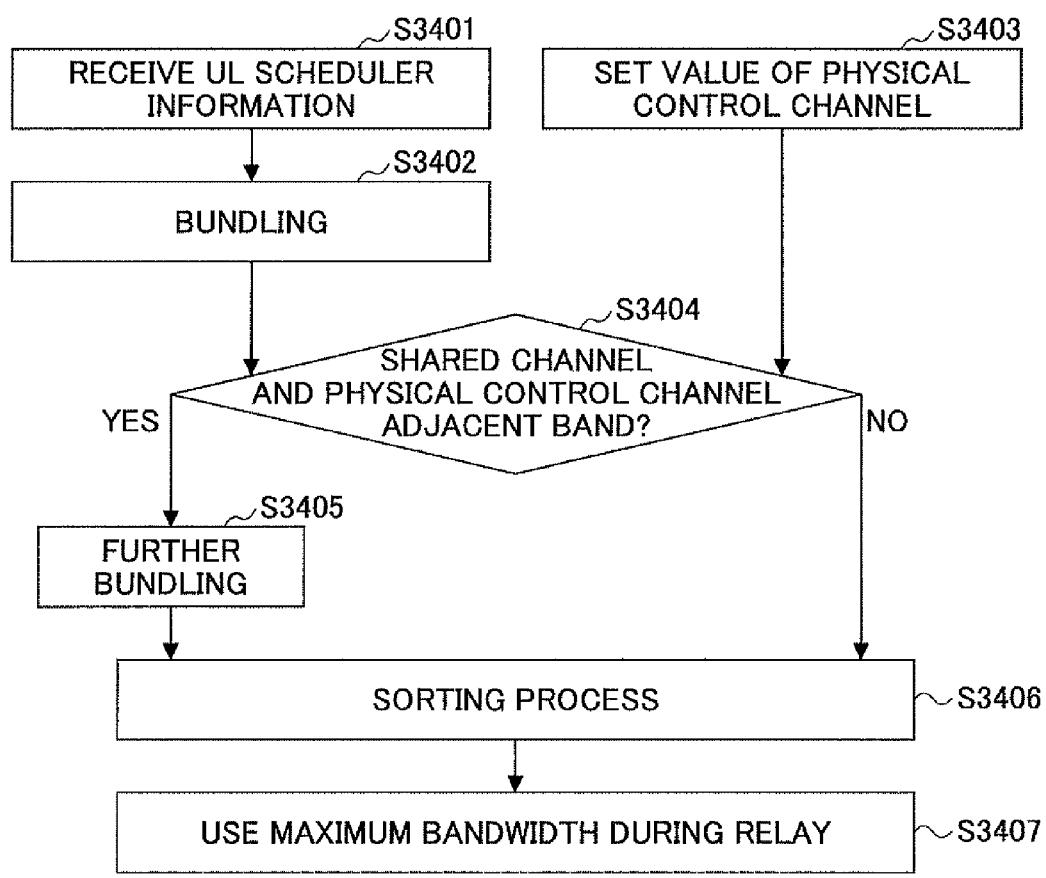
FIG. 34 is a flowchart illustrating another example of a relay method according to an embodiment of the present invention.

FIG. 34 is a flowchart illustrating an example of the relay method described above with FIGS. 8A-8C.

In step S3401, the relay node receives signals indicating UL scheduler information and performs bundling according to the UL scheduler information (Step S3402).

In Step S3403, the relay node searches and obtains setting values of the physical control channel in parallel with the steps of S3401 and S3402.

In a case where the frequency band of the shared channel and the frequency band of the physical control channel are not adjacent (No in Step S3404), the frequency band of the physical control channel is not used. However, the signals of the shared channel and the control signals of the physical control channel are multiplexed by using the frequency band selected in the shared channel and mapped to a single physical control channel.

In a case where the frequency band of the shared channel and the frequency band of the physical control channel are adjacent (Yes in Step S3404), further bundling is performed on the frequency band of the shared channel and the frequency band of the physical control channel (Step S3405).

Then, a maximum bandwidth of the bundled frequency bands is detected, stored, and sorted (Step S3406). Then, the bundled frequency band having the maximum value is used during relay (Step S3407). Thereby, frequency bands can be efficiently used.

Next, a process of mapping and extracting signals (data) of the shared channel and the physical control channel is described with reference to FIGS. 35-38.

Figure 35:
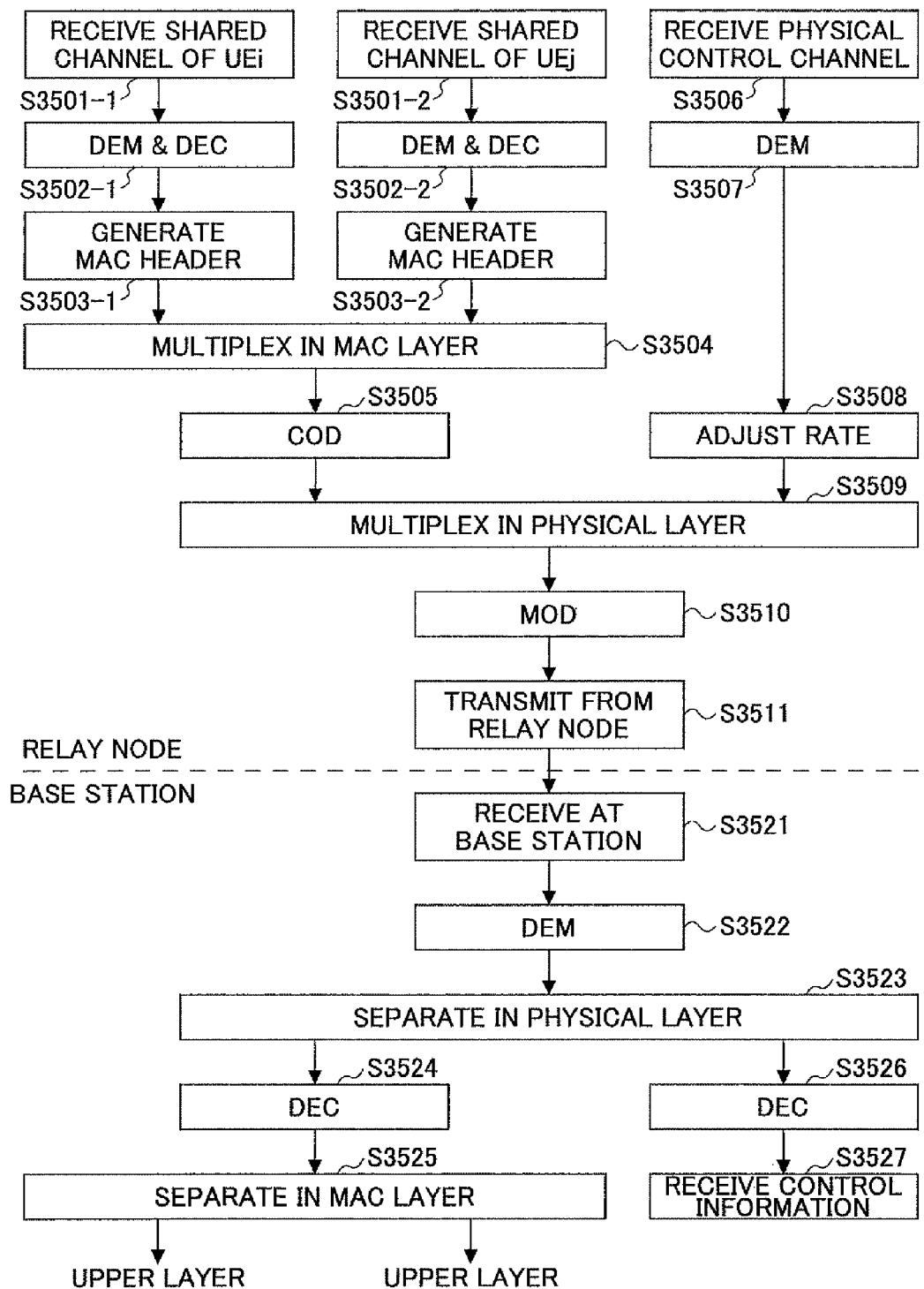
FIG. 35 is a flowchart illustrating an example of a multiplexing method according to an embodiment of the present invention.

FIG. 35 is a flowchart illustrating an example of the multiplexing method described above with FIGS. 9A-9C.

In Step S3501-1 and S3501-2, the relay node receives shared channel signals from a user equipment i (UEi) and a user equipment j (UEj) that are to be multiplexed. Then, in Step S3502-1 and S3502-2, the received signals are modulated/decoded. Then, in Steps S3503-1 and S3503-2, MAC headers are generated.

Then, the shared channel signals (shared channel data) of the UEi and UEj are multiplexed at the MAC layer (Step S3504). Then, the multiplexed signals are coded (Step S3505).

Further, in Step S3506, the relay node receives physical control channel signals. Then, in Step S3507, the relay node only performs demodulation on the physical control channel signals. Then, in Step S3508, the relay node performs rate adjustment on the demodulated physical control channel signals.

Then, in Step S3509, the coded shared channel signals and the rate adjusted physical control channel signals are multiplexed at the physical layer. Then, in Step S3510, the multiplexed signals are modulated. Then, in Step S3511, the modulated signals are transmitted from the relay node.

Then, in Step S3521, the base station receives signals relayed from the relay node. Then, in Step S3522, the base station demodulates the received signals. Then, in Step S3523, the base station separates the demodulated signals into shared channel signals and physical control channel signals at the physical layer.

Then, in Step S3524, the separated shared channel signals are decoded. Then, in Step S3525, the decoded shared channel signals are further separated in correspondence with each user equipment at the MAC layer and then transferred to an upper layer.

Meanwhile, the separated physical control channel signals are decoded in Step S3526 and received as control signals in Step S3527.

Figure 36:
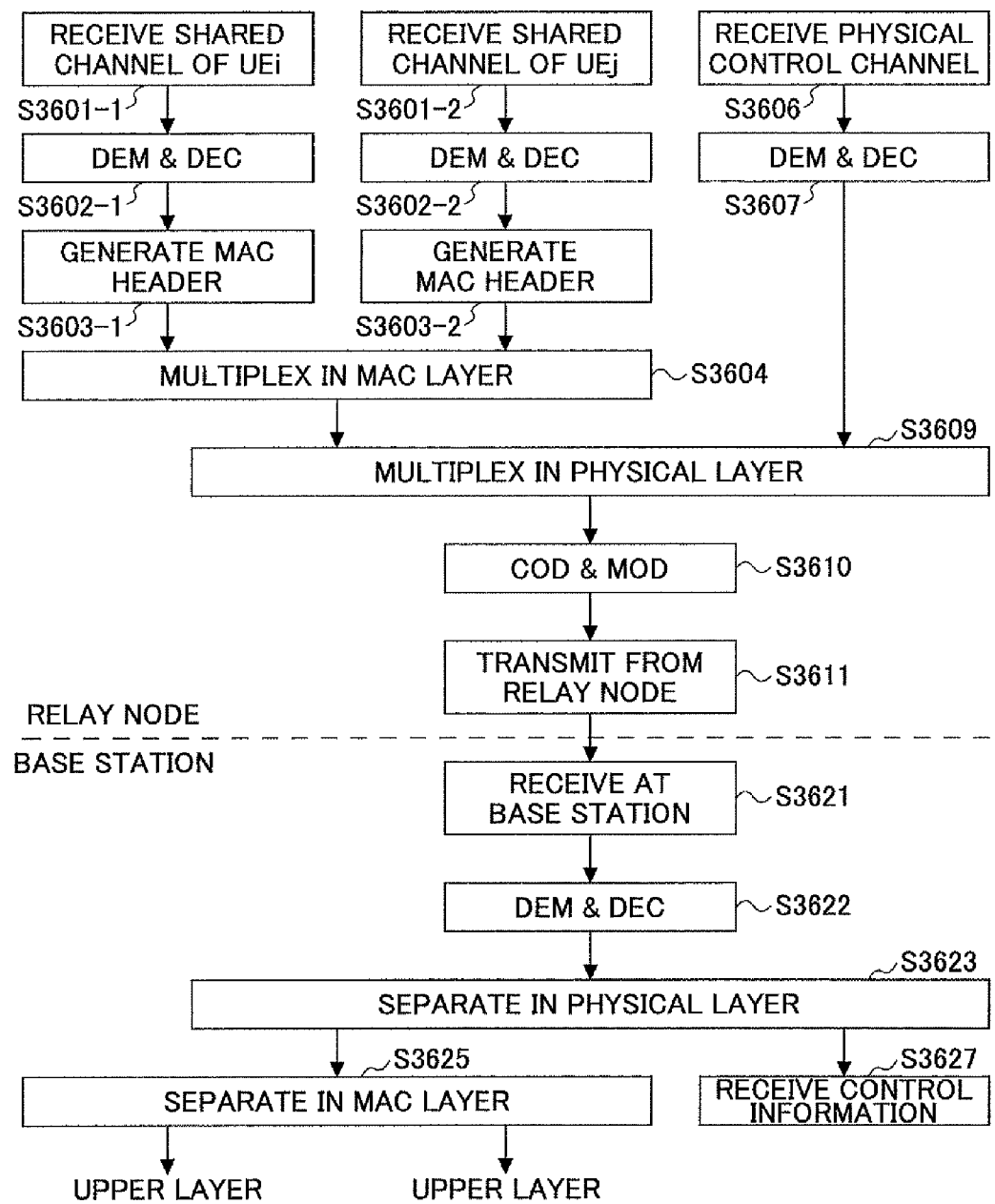
FIG. 36 is a flowchart illustrating another example of a multiplexing method according to an embodiment of the present invention.

FIG. 36 is a flowchart illustrating an example of the multiplexing method described above with FIGS. 10A-10C.

In Step S3601-1 and S3601-2, the relay node receives shared channel signals from a user equipment i (UEi) and a user equipment j (UEj) that are to be multiplexed. Then, in Step S3602-1 and S3602-2, the received signals are modulated/decoded. Then, in Steps S3603-1 and S3603-2, MAC headers are generated.

Then, the shared channel signals (shared channel data) of the UEi and UEj are multiplexed at the MAC layer (Step S3604). The following steps differ from the multiplexing method of FIG. 35.

In Step S3606, the relay node receives physical control channel signals. Then, in Step S3607, the received physical control channel signals are demodulated and decoded.

Then, in Step S3609, the multiplexed shared channel signals and the decoded physical control channel signals are multiplexed at the physical layer. Then, in Step S3610, the multiplexed signals are coded and modulated. Then, in Step S3611, the coded/modulated signals are transmitted from the relay node.

Because the coding process is performed not only on the multiplexed shared channel signal but also on the physical control channel signals, there is no need to perform rate adjustment on the physical control channel signals.

Then, in Step S3621, the base station receives signals relayed from the relay node. Then, in Step S3622, the base station demodulates and decodes the received signals. Then, in Step S3623, the base station separates the decoded signals into shared channel signals and physical control channel signals at the physical layer.

Then, in Step S3625, the shared channel signals separated from the physical control channel signals at the physical layer are further separated in correspondence with each user equipment at the MAC layer and then transferred to an upper layer.

Meanwhile, in Step S3627, the physical control channel signals separated from the shared channel signals at the physical layer are received as control signals.

Figure 37:
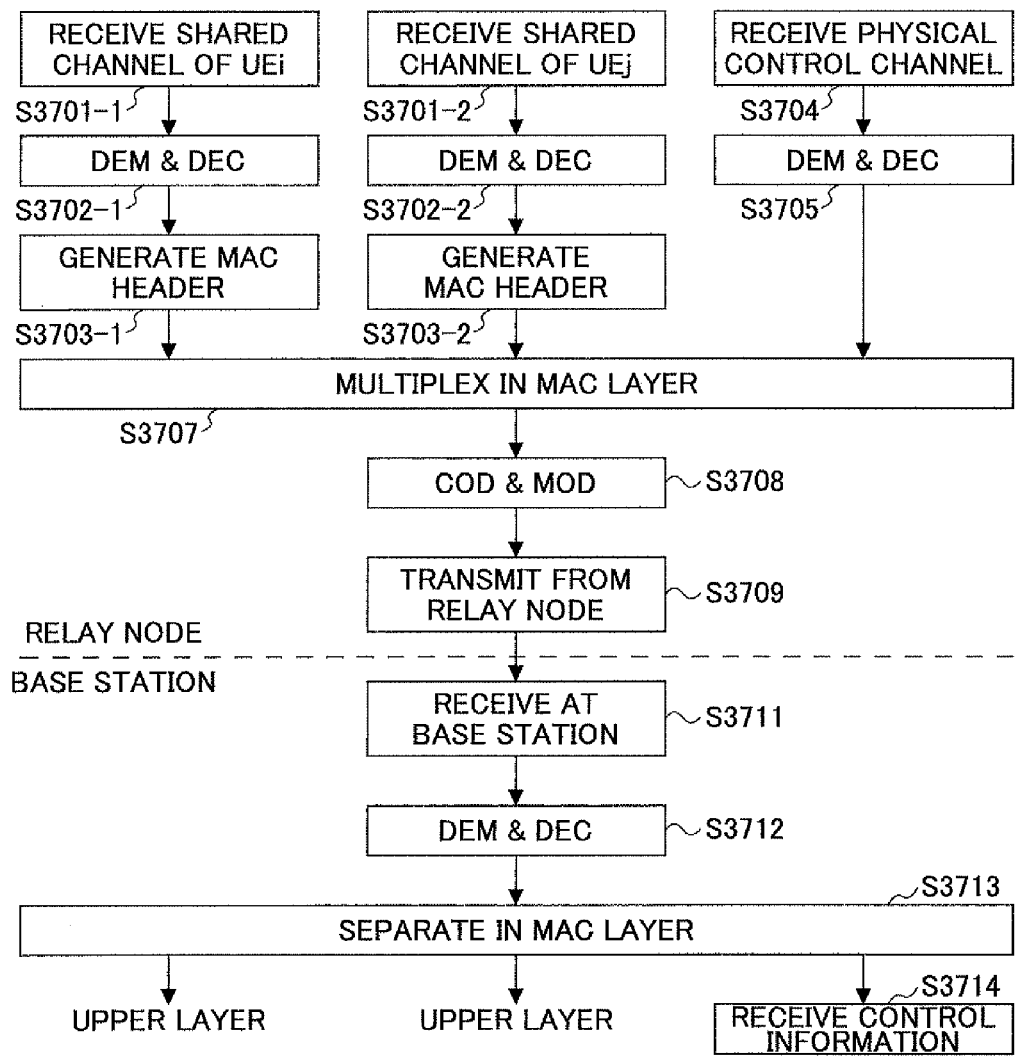
FIG. 37 is a flowchart illustrating another example of a multiplexing method according to an embodiment of the present invention.

FIG. 37 is a flowchart illustrating an example of the multiplexing method described above with FIGS. 11A-11C.

In Step S3701-1 and S3701-2, the relay node receives shared channel signals from a user equipment i (UEi) and a user equipment j (UEj) that are to be multiplexed. Then, in Step S3702-1 and S3702-2, the received signals are modulated/decoded. Then, in Steps S3703-1 and S3703-2, MAC headers are generated.

Meanwhile, in Step S3704, the relay node receives physical control channel signals. Then, in Step S3705, the relay node demodulates and decodes the received physical control channel signals.

Then, in Step S3707, the relay node multiplexes the multiplexed shared channel signals and the decoded physical control channel signals at the MAC layer. In this step, the shared channel signals and the physical control channel signals are multiplexed so that the physical control channel signals are allocated at a predetermined (specified) location.

Then, in Step S3708, the multiplexed signals are coded and modulated. Then, in Step S3709, the modulated signals are relayed (transmitted) from the relay node.

Then, in Step S3711, the base station receives the signals relayed from the relay node. Then, in Step S3712, the base station demodulates and decodes the received signals. Then, in Step S3713, the decoded signals (signals multiplexed at the MAC layer) are separated at the MAC layer.

Then, the shared channel signals separated from the physical control channel signals are transferred to an upper layer in correspondence with each user equipment. Meanwhile, in Step S3714, the physical control channel signals separated from the shared channel signals at the MAC layer are received as control signals.

Figure 38:
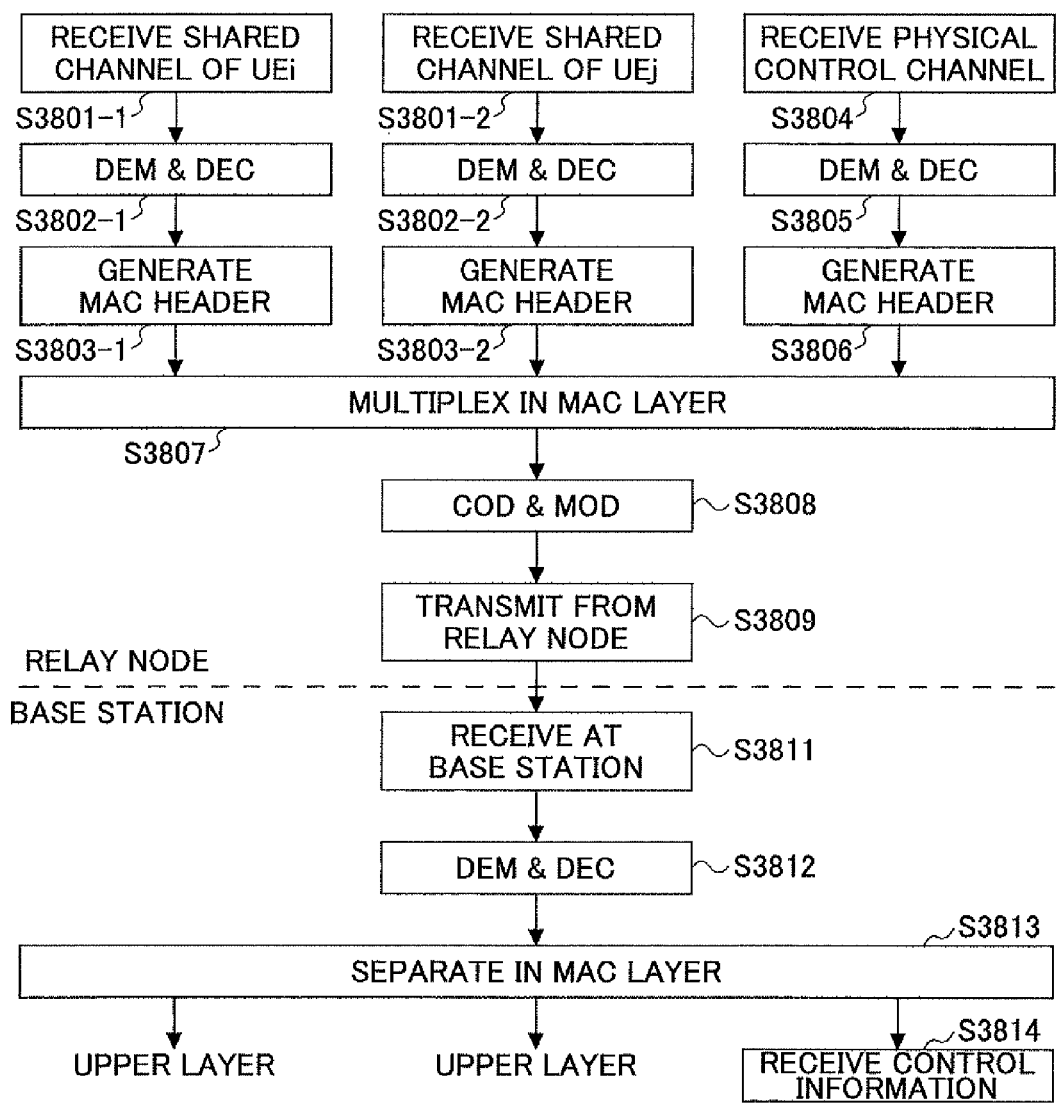
FIG. 38 is a flowchart illustrating another example of a multiplexing method according to an embodiment of the present invention.

FIG. 38 is a flowchart illustrating an example of the multiplexing method described above with FIGS. 12A-12C.

In Step S3801-1 and S3801-2, the relay node receives shared channel signals from a user equipment i (UEi) and a user equipment j (UEj) that are to be multiplexed. Then, in Step S3802-1 and S3802-2, the received signals are modulated/decoded. Then, in Steps S3803-1 and S3803-2, MAC headers are generated.

Meanwhile, in Step S3804, the relay node receives physical control channel signals. Then, in Step S3805, the relay node demodulates and decodes the received physical control channel signals. Then, in Steps S3806, MAC headers of the physical control channel signals are generated.

Then, in Step S3807, the relay node multiplexes the shared channel signals and the physical control channel signals at the MAC layer. Then, in Step S3808, the multiplexed signals are modulated and coded. Then, in Step S3809, the coded signals are relayed (transmitted) from the relay node.

Then, in Step S3811, the base station receives the signals relayed from the relay node. Then, in Step S3812, the base station demodulates and decodes the received signals. Then, in Step S3813, the decoded signals (signals multiplexed at the MAC layer) are separated at the MAC layer.

Then, the shared channel signals separated from the physical control channel signals are transferred to an upper layer in correspondence with each user equipment. Meanwhile, in Step S3814, the physical control channel signals separated from the shared channel signals at the MAC layer are received as control signals.

Next, an example of the above-described MCS adjustment (determining the number of padding to be inserted, see FIG. 13) is described. FIG. 39 is a flowchart illustrating an example of MCS adjustment according to an embodiment of the present invention.

When receiving UL scheduler information (Step S3901), the relay node extracts the size of a transport block (TBS, Transport Block Size) of a relay transmission timing in correspondence with each user equipment (Step S3902-1 to S3902-N).

Then, in Step S3903, the relay node calculates the accumulated TBS of the relay transmission timings of the user equipments. Then, in Step S3904, the relay node calculates a MAC increase/decrease value due to UE multiplex (corresponding to (A+B+γ of the above-described Formula (2)).

Meanwhile, in Step S3905, the relay node also calculates the frequency bandwidth BW in the frequency band selection part (e.g., frequency band selection part 2014-1 of FIG. 23) based on UL scheduler information.

By using the above-described Formula (2), an MCS index (MCS_config) is calculated based on A+B+γ obtained in Step S3904 and the bandwidth (BW) obtained in Step S3906.

Then, in Step S3907, the range of the MCS_config is determined based on the conversion table (e.g., above-described Table 1) for deriving a stream number, a modulation value, and a coding value.

Then, in Step S3908, a value of a coding rate (coding rate value) R is derived based on the determined range of the MCS_config. Then, in Step S3909, a value of a padding amount (padding amount value) P is calculated based on the derived coding rate value R. Then, in Step S3910, the calculated stream number, the modulation value, the coding value, and the padding amount value P are output (Step S3910).

It is to be noted that even in a case where a specified carrier wave frequency between a user equipment and a relay node and a specified carrier wave frequency between a relay node and a base station are not the same (e.g., a case of performing relay with a carrier wave frequency of F0 between a user equipment and a carrier node and switching to a carrier wave frequency of F1 between a relay node and a base station), a frequency band in the carrier wave frequency can be selected by using the above-described algorithm.

Figure 40:
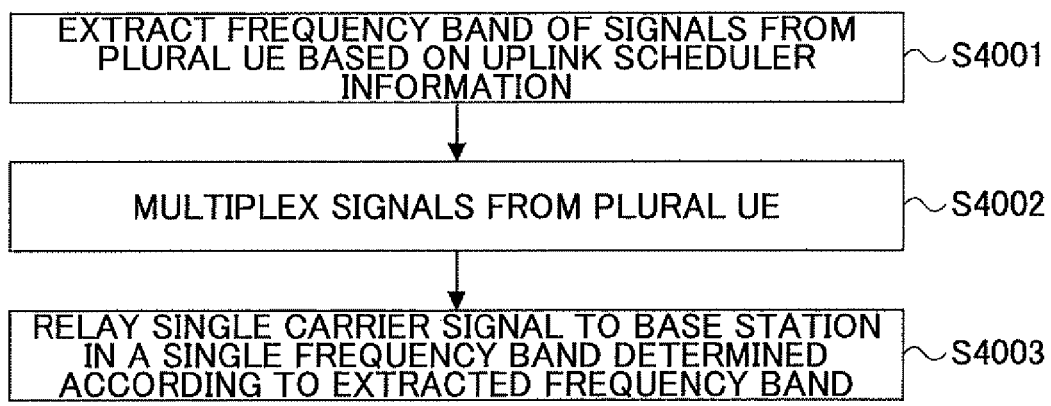
FIG. 40 is a flowchart illustrating another example of a relay method according to an embodiment of the present invention.

FIG. 40 is a flowchart illustrating an example of a relay method according to an embodiment of the present invention.

In Step S4001, the relay node extracts frequency band information of signals received from plural user equipments based on UL scheduler information. Then, in Step S4002, the relay node multiplexes the signals received from the plural user equipments. Then, in Step S4003, relays the received signals to the base station as single carrier signals with a single frequency band that is determined according to the extracted frequency band.

An example of a hardware configuration of the above-described embodiment of the wireless base station is described. Each function of the above-described embodiment of the wireless base station is partly or entirely achieved by the following hardware components. The above-described embodiment of the wireless base station includes, for example, a wireless IF (InterFace), a processor, a memory, a logic circuit, and a wire IF. The wireless IF is an interface device that performs wireless communications with a wireless terminal. The processor is a device that processes data (e.g., CPU (Central Processing Unit), DSP (Digital Signal Processor)). The memory is a device that stores data therein (e.g., ROM (Read Only Memory), RAM (Random Access Memory)). The logic circuit is an electronic circuit that performs logical operation (e.g., LSI (Large Scale Integration), FPGA (Field-Programming Gate Array), ASIC (Application Specific Integrated Circuit)). The wire IF is an interface device that performs wire communication with, for example, another wireless base station connected to a network on a network side of a mobile phone system (so-called "backhaul network").

An example of a hardware configuration of the above-described embodiment of the relay station is described. Each function of the above-described embodiment of the relay station is partly or entirely achieved by the following hardware components. The above-described embodiment of the relay station includes, for example, a wireless IF (InterFace), a processor, a memory, and a logic circuit. The wireless IF is an interface device that performs wireless communications with a wireless terminal. The processor is a device that processes data (e.g., CPU (Central Processing Unit), DSP (Digital Signal Processor)). The memory is a device that stores data therein (e.g., ROM (Read Only Memory), RAM (Random Access Memory)). The logic circuit is an electronic circuit that performs logical operation (e.g., LSI (Large Scale Integration), FPGA (Field-Programming Gate Array), ASIC (Application Specific Integrated Circuit)).

An example of a hardware configuration of the above-described embodiment of the wireless terminal is described. Each function of the above-described embodiment of the wireless terminal is partly or entirely achieved by the following hardware components. The above-described embodiment of the wireless base station includes, for example, a wireless IF (InterFace), a processor, a memory, a logic circuit, an input IF and an output IF. The wireless IF is an interface device that performs wireless communications with a wireless terminal. The processor is a device that processes data (e.g., CPU (Central Processing Unit), DSP (Digital Signal Processor)). The memory is a device that stores data therein (e.g., ROM (Read Only Memory), RAM (Random Access Memory)). The logic circuit is an electronic circuit that performs logical operation (e.g., LSI (Large Scale Integration), FPGA (Field-Programming Gate Array), ASIC (Application Specific Integrated Circuit)). The input IF is a device that performs input (e.g., control button, microphone). The output IF is a device that performs output (e.g., display, speaker).

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A relay node comprising:
   a processor configured to determine, based on uplink scheduler information, a single target frequency band from a plurality of frequency bands assigned to signals received from a plurality of user equipments, multiplex the signals received from the plural user equipments, and map the multiplexed signals to a single transport block; and
   a wireless communication interface configured to transmit the mapped signals as a single carrier signal to a base station by using the single target frequency band.

2. The relay node as claimed in claim 1, wherein the processor is configured to determine that the single target frequency band is a frequency band having the widest bandwidth among the plural frequency bands.

3. The relay node as claimed in claim 1, wherein the processor is configured to combine adjacent frequency bands among the plural frequency bands and determine the single target frequency band based on the bundled adjacent frequency bands.

4. The relay node as claimed in claim 3,
   wherein the wireless communication interface is configured to extract a control signal from the signals received from the plural user equipments; and
   wherein the processor is configured to multiplex the control signal and the single carrier signal and combine adjacent frequency bands among the plural frequency bands and determine the single target frequency band based on the bundled adjacent frequency bands.

5. The relay node as claimed in claim 1,
   wherein the wireless communication interface is configured to extract a control signal from the signals received from the plural user equipments; and
   wherein the processor is configured to multiplex the control signal and the single carrier signal.

6. The relay node as claimed in claim 5, wherein the processor is configured to multiplex control information included in the control signal as header information of a MAC layer.

7. The relay node as claimed in claim 1,
   wherein the wireless communication interface is configured to receive a signal from the base station, the signal including an instruction to arrange the plural frequency bands adjacent to each other;
   wherein the processor is configured to determine the single target frequency band based on the instruction.

8. The relay node as claimed in claim 1, wherein the processor is configured to obtain an MCS (Modulation and channel Coding Scheme) index value based on a bandwidth of the single target frequency band and an amount of data to be transmitted and select a combination of a modulation depth and a coding rate in comparison with a predetermined conversion index.

9. The relay node as claimed in claim 8, wherein the wireless communication interface is configured to add padding data to the data to be transmitted for obtaining the combination of the modulation depth and the coding rate selected by the setting part.

10. A base station comprising:
   a processor configured to determine, based on uplink scheduler information, a single target frequency band from a plurality of frequency bands assigned to multiplexed signals mapped to a single transport block and received from a plurality of user equipments; and
   a wireless communication interface configured to receive the mapped multiplexed signals transmitted as a single carrier signal based on the single target frequency band.

11. The base station as claimed in claim 10, wherein the processor is configured to obtain an MCS (Modulation and channel Coding Scheme) index value based on a bandwidth of the single target frequency band and an amount of data to be received and select a combination of a modulation depth and a coding rate in comparison with a predetermined conversion index.

12. The base station as claimed in claim 10, wherein the processor is configured to generate a signal including an instruction to arrange the plural frequency bands adjacent to each other.

13. The base station as claimed in claim 11, wherein the processor is configured to discard padding data to the data to be received for obtaining the combination of the modulation depth and the coding rate selected by the processor.

14. A user equipment comprising:
   a wireless communication interface configured to receive a signal from a base station, the signal including an instruction to arrange a plurality of frequency bands adjacent to each other, the plural frequency bands being assigned to signals received from a plurality of user equipments;
   a processor configured to control the wireless communication interface to transmit a single carrier signal based on the instruction included the signal received, so that the single carrier signal is multiplexed, mapped to a single transport block, and transmitted as another single carrier signal by a relay station based on uplink scheduler information.

\* \* \* \* \*